US007121253B2

(12) United States Patent
Shiraishi et al.

(10) Patent No.: US 7,121,253 B2
(45) Date of Patent: Oct. 17, 2006

(54) CYLINDER INJECTION TYPE INTERNAL COMBUSTION ENGINE, CONTROL METHOD FOR INTERNAL COMBUSTION ENGINE, AND FUEL INJECTION VALVE

(75) Inventors: Takuya Shiraishi, Hitachi (JP); Toshiharu Nogi, Hitachi (JP); Minoru Ohsuga, Hitachi (JP); Yoko Nakayama, Hitachi (JP); Noboru Tokuyasu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/340,762

(22) Filed: Jan. 27, 2006

(65) Prior Publication Data

US 2006/0118079 A1 Jun. 8, 2006

Related U.S. Application Data

(60) Continuation of application No. 10/779,796, filed on Feb. 18, 2004, now Pat. No. 7,013,863, which is a continuation of application No. 10/157,983, filed on May 31, 2002, now Pat. No. 6,732,706, which is a continuation of application No. 09/837,422, filed on Apr. 19, 2001, now Pat. No. 6,520,144, which is a division of application No. 09/486,055, filed as application No. PCT/JP99/03300 on Jun. 22, 1999, now Pat. No. 6,390,059.

(30) Foreign Application Priority Data

Jun. 22, 1998 (JP) .................................. 10-174336

(51) Int. Cl.
*F02B 5/02* (2006.01)

(52) U.S. Cl. ........................................ 123/301; 123/305

(58) Field of Classification Search ................ 123/301, 123/305
See application file for complete search history.

(56) References Cited

U.S. PATENT DOCUMENTS

| 5,775,288 A | | 7/1998 | Suzuki et al. | |
| 5,850,816 A | | 12/1998 | Ohsuga et al. | |
| 5,878,712 A | * | 3/1999 | Wolters et al. | 123/301 |
| 5,884,611 A | * | 3/1999 | Tarr et al. | 123/531 |
| 5,890,466 A | * | 4/1999 | Pischinger | 123/298 |
| 5,941,207 A | * | 8/1999 | Anderson et al. | 123/295 |
| 5,943,993 A | * | 8/1999 | Carstensen et al. | 123/298 |
| 6,003,488 A | * | 12/1999 | Roth | 123/298 |
| 6,009,849 A | * | 1/2000 | Yamamoto et al. | 123/298 |

(Continued)

FOREIGN PATENT DOCUMENTS

JP    1-267328    10/1989

(Continued)

*Primary Examiner*—Erick Solis
(74) *Attorney, Agent, or Firm*—Crowell & Moring LLP

(57) ABSTRACT

There is provided a cylinder injection type internal combustion engine capable of performing stratified charge operation at the time of a vehicle speed of 120 km/h and/or an engine rotational speed of 3200 rpm to enhance the fuel efficiency and/or to observe the emission regulations. In the internal combustion engine, a stratum of air and/or air flow is formed between a fuel spray injected from an injection valve and the top face of a piston and/or the wall surface of a combustion chamber, and a face shape contrived to guide the air flow is formed on the top face of the piston. Also, the stratified charge operation can be performed even at the time of cold start or cranking.

5 Claims, 39 Drawing Sheets

U.S. PATENT DOCUMENTS

| | | | |
|---|---|---|---|
| 6,032,652 A * | 3/2000 | Nozawa et al. | 123/478 |
| 6,035,822 A * | 3/2000 | Suzuki et al. | 123/298 |
| 6,042,028 A * | 3/2000 | Xu | 239/585.1 |
| 6,095,437 A * | 8/2000 | Nozawa et al. | 239/408 |
| 6,125,817 A * | 10/2000 | Piock et al. | 123/301 |
| 6,138,639 A * | 10/2000 | Hiraya et al. | 123/295 |
| 6,148,792 A * | 11/2000 | Hei Ma | 123/298 |
| 6,386,175 B1 * | 5/2002 | Yang | 123/298 |
| 6,450,417 B1 * | 9/2002 | Gipson et al. | 239/5 |
| 6,837,211 B1 * | 1/2005 | Noda et al. | 123/295 |

FOREIGN PATENT DOCUMENTS

| | | |
|---|---|---|
| JP | 06-081656 | 3/1994 |
| JP | 6-108852 | 4/1994 |
| JP | 06-123245 | 5/1994 |
| JP | 06-299932 | 10/1994 |
| JP | 7-119507 | 5/1995 |
| JP | 07-243368 | 9/1995 |
| JP | 07-246352 | 9/1995 |
| JP | 07-293259 | 11/1995 |
| JP | 07-293304 | 11/1995 |
| JP | 8-246936 | 9/1996 |
| JP | 9-014103 | 1/1997 |
| JP | 9-79081 | 3/1997 |
| JP | 09-317479 | 12/1997 |
| JP | 09-317505 | 12/1997 |
| JP | 10-000896 | 1/1998 |
| JP | 10-030441 | 2/1998 |
| JP | 10-61483 | 3/1998 |
| JP | 10-089127 | 4/1998 |
| JP | 10-110660 | 4/1998 |
| JP | 10-122096 | 5/1998 |
| JP | 10-159621 | 6/1998 |
| JP | 10-169447 | 6/1998 |
| JP | 10-184489 | 7/1998 |
| JP | 10-299539 | 11/1998 |
| JP | 11-22534 | 1/1999 |
| JP | 11-036959 | 2/1999 |
| JP | 11-62787 | 3/1999 |
| JP | 11-141338 | 5/1999 |
| JP | 11-193722 | 7/1999 |
| WO | WO 96/36808 | 11/1996 |

* cited by examiner (a)

(b)

(a)

(b)

(a)

(b)

(c)

(a)

(b)

(a)

(b)

(a)

(b)

(a)

(b)

(a)

(b)

(a)

(b)

(a)

(b)

(a)

(b)

(a)
180 (deg BTDC)

(b)
60 (deg BTDC)

(a)

(b)

(a)

\* BTDC : 70 deg (at ;1400rpm, Pi 320KPa)
\*\* BTDC : 90 deg (at ;3200rpm, Pi 350KPa)

(b)

\* BTDC : 35 deg (at ;1400rpm, Pi 320KPa)
\*\* BTDC : 30 deg (at ;3200rpm, Pi 350KPa)

FROM ENGINE HEAD

TO BLOWER

* # CYLINDER INJECTION TYPE INTERNAL COMBUSTION ENGINE, CONTROL METHOD FOR INTERNAL COMBUSTION ENGINE, AND FUEL INJECTION VALVE

This application is a continuation of application Ser. No. 10/779,796, filed Feb. 18, 2004 now U.S. Pat. No. 7,013,863, which is a continuation of application Ser. No. 10/157,983, filed May 31, 2002 now U.S. Pat. No. 6,732,706, which is a continuation of Ser. No. 09/837,422, filed Apr. 19, 2001 now U.S. Pat. No. 6,520,144, which is a divisional of application Ser. No. 09/486,055, filed Feb. 22, 2000 now U.S. Pat. No. 6,390,059, which is a 371 of PCT/JP99/03300, filed Jun. 22, 1999.

TECHNICAL FIELD

The present invention relates to a cylinder injection type internal combustion engine in which fuel is injected directly into a combustion chamber of an internal combustion engine, a control method for an internal combustion engine, and a fuel injection valve.

BACKGROUND ART

In a conventional internal combustion engine of this type, a projecting portion is formed in the center on top face of a piston to form a depression called a cavity in the piston. Thereupon, fuel is injected from a fuel injection valve toward this cavity in the piston at the second half stage of the compression stroke of the internal combustion engine, so that a fuel spray repelled by the cavity is concentrated in the direction of ignition plug (Society of Automotive Engineers of Japan Annual Proceedings 976, Paper No. 9740307, October, 1997).

Thus, the stratification of fuel in the combustion chamber is achieved, and combustion can be produced even with a lean mixture of an air-fuel ratio of about 40. Usually, such a combustion process is referred to as a stratified charge lean burn operation, which serves for reducing fuel consumption at the time of low-load operation of the internal combustion engine.

Also, JP-A-7-119507 has disclosed a combustion system in which at the time of high-load operation, the operation is switched to a so-called homogeneous operation in which fuel is injected during the intake stroke so that the fuel is distributed uniformly in the whole of the combustion chamber.

Further, JP-A-6-81656, JP-A-10-110660, JP-A-7-293259, JP-A-10-30441, JP-A-10-169447, and JP-A-10-896, and U.S. Pat. No. 5,850,816 have disclosed a combustion system in which a tumble air flow is produced in the combustion chamber, and a fuel spray is concentrated around the ignition plug by this tumble air flow.

However, even if any of the above-described combustion systems is used, most of fuel injected from the injection valve sticks to the piston and the wall surface in the combustion chamber, so that there are limitations in increasing fuel efficiency and reducing harmful components (for example, hydrocarbon) in exhaust gas due to the stratified charge operation.

Also, the stratified charge operation cannot be provided under a condition of 80 km/h or 2400 rpm and higher.

A first object of the present invention is to reduce fuel sticking to the piston and the wall surface in the combustion chamber and to decrease HC in exhaust gas.

A second object of the present invention is to increase the output at the time of homogeneous operation.

A third object of the present invention is to provide a fuel injection valve for cylinder injection, in which less fuel sticks to the piston.

A fourth object of the present invention is to enable the stratified charge operation even at a vehicle speed of 80 km/h and higher or at an engine rotational speed of 2400 rpm and higher (for example, in a high speed region where the vehicle speed is 120 km/h or the engine rotational speed is 3200 rpm).

DISCLOSURE OF THE INVENTION

The above first object is attained by a cylinder injection type internal combustion engine comprising a combustion chamber into which air is sucked; a fuel injection valve for injecting fuel directly into the combustion chamber; and a piston for changing the volume of the combustion chamber, whose central portion of top face is equal in height to or lower than the surroundings, characterized in that a stratum of the sucked air or a stratum of air flow is interposed between a fuel spray injected from the fuel injection valve and the piston.

Also, the above first object is attained by a cylinder injection type internal combustion engine comprising a fuel injection valve for injecting fuel directly into a combustion chamber of the internal combustion engine, characterized in that penetration of a fuel spray injected from the fuel injection valve into the combustion chamber is set to be shorter than a distance between the top face of a piston reciprocating in the combustion chamber and a fuel discharge port of the fuel injection valve during a period of time from the start of injection to the completion of injection of fuel.

Also, the above first object is attained by a cylinder injection type internal combustion engine comprising a fuel injection valve for injecting fuel directly into a combustion chamber of the internal combustion engine, the fuel injection valve being formed so that the penetration of a fuel spray 3.8 msec after the injection of fuel to the atmosphere of the atmospheric pressure is 60 mm or shorter.

Also, the above first object is attained by a cylinder injection type internal combustion engine comprising a fuel injection valve for injecting fuel directly into a combustion chamber of the internal combustion engine, the fuel injection valve being formed so that a fuel spray with a Zauter mean particle size of 20 μm or smaller is injected.

Also, the above first object is attained by a cylinder injection type internal combustion engine, comprising a combustion chamber for the internal combustion engine into which air is sucked through an intake valve; a fuel injection valve for injecting fuel directly into the combustion chamber; swirl flow generating means for generating an air flow in the combustion chamber; and operation condition detecting means for detecting the operation condition of the internal combustion engine, the internal combustion engine having a control unit for supplying a fuel injection valve driving signal to the fuel injection valve so that fuel is injected at the second half stage of the compression stroke when the detected operation condition is at a low load.

Also, the above second object is attained by a cylinder injection type internal combustion engine comprising a combustion chamber of the internal combustion engine, into which air is sucked through an intake valve; a fuel injection valve for injecting fuel directly into the combustion chamber; swirl flow generating means for generating a swirl air flow in the combustion chamber; and operation condition detecting means for detecting the operation condition of the internal combustion engine, the internal combustion engine having a control unit for supplying a fuel injection valve driving signal to the fuel injection valve so that fuel is injected on the intake stroke when the detected operation condition is at a medium load.

Also, the above second object is attained by a cylinder injection type internal combustion engine comprising a combustion chamber of the internal combustion engine, into which air is sucked through an intake valve; a fuel injection valve for injecting fuel directly into the combustion chamber; and operation condition detecting means for detecting the operation condition of the internal combustion engine, the internal combustion engine having a control unit for supplying a fuel injection valve driving signal to the fuel injection valve so that fuel is injected for a period of time when the intake air velocity is lower than the spray velocity on the intake stroke when the detected operation condition is at a high load.

Also, the above second object is attained by a cylinder injection type internal combustion engine comprising an upstream swirl type fuel injection valve for injecting fuel directly into a combustion chamber of the internal combustion engine; and operation condition detecting means for detecting the operation condition of the internal combustion engine, the internal combustion engine having a control unit for supplying a fuel injection valve driving signal to the fuel injection valve so that fuel is injected at a time for a period of time when the intake air velocity is higher than the spray velocity on the intake stroke when the detected operation condition is at a high load.

Also, the above first object is attained by a control method for a cylinder injection type internal combustion engine, in which when the operation condition of the internal combustion engine is at a low load, a swirl air flow is generated in a combustion chamber, fuel is injected at the first half stage of the compression stroke, and a rich mixture stratum is formed inside the swirl air flow, whereby stratified charge lean operation is performed.

Also, the above second object is attained by a control method for a cylinder injection type internal combustion engine, in which when the operation condition of the internal combustion engine is at a medium load, a swirl air flow is generated in a combustion chamber, fuel is injected on the intake stroke, and a mixture with a homogeneous concentration is generated in the combustion chamber by the swirl air flow, whereby homogeneous lean operation is performed.

Also, the above second object is attained by a control method for a cylinder injection type internal combustion engine, in which when the operation condition of the internal combustion engine is at a high load, fuel having an amount capable of achieving a stoichiometric air-fuel ratio is injected for a period of time when the intake air velocity is lower than the spray velocity on the intake stroke, and a mixture with a homogeneous concentration is generated in the combustion chamber by intake air, whereby homogeneous stoichiometric operation is performed.

Also, the above third object is attained by a fuel injection valve for injecting fuel directly into a combustion chamber of an internal combustion engine, characterized in that a fuel spray injected from the fuel injection valve has a penetration of 60 mm or shorter 3.8 msec after the time when fuel is injected to the atmosphere of the atmospheric pressure.

Also, the above third object is attained by a fuel injection valve for injecting fuel directly into a combustion chamber of an internal combustion engine, characterized in that the spray particle size of fuel injected from the fuel injection valve is 20 μm or smaller in terms of Zauter mean particle size.

Further, the above fourth object is attained by a cylinder injection type internal combustion engine comprising a combustion chamber into which air is sucked; a fuel injection valve for injecting fuel directly into the combustion chamber; and a piston for changing the volume of the combustion chamber, characterized in that an air flow is generated in the combustion chamber to form a stratum of the sucked air or a stratum of air flow between a fuel spray injected from the fuel injection valve and the piston, and a guide face for guiding the flow on the top face of piston to a position just under the injection valve.

Specifically, the object is attained by a cylinder injection type internal combustion engine comprising air flow generating means for generating a tumble air flow in a combustion chamber of the engine; a piston having a top face shape contrived so as to guide the air flow generated in the combustion chamber from the side distant from a fuel injection valve to a position just under the fuel injection valve along the top face of the piston; and the fuel injection valve for supplying a fuel spray to the outer stratum of the air flow extending from the fuel injection valve to an ignition plug.

BRIEF DESCRIPTION OF THE DRAWINGS

FIG. 47 is a schematic view in which FIG. 46 is viewed from above the combustion chamber.

BEST MODE FOR CARRYING OUT THE INVENTION

Embodiments of the present invention will be described with reference to the accompanying drawings.

Figure 1:
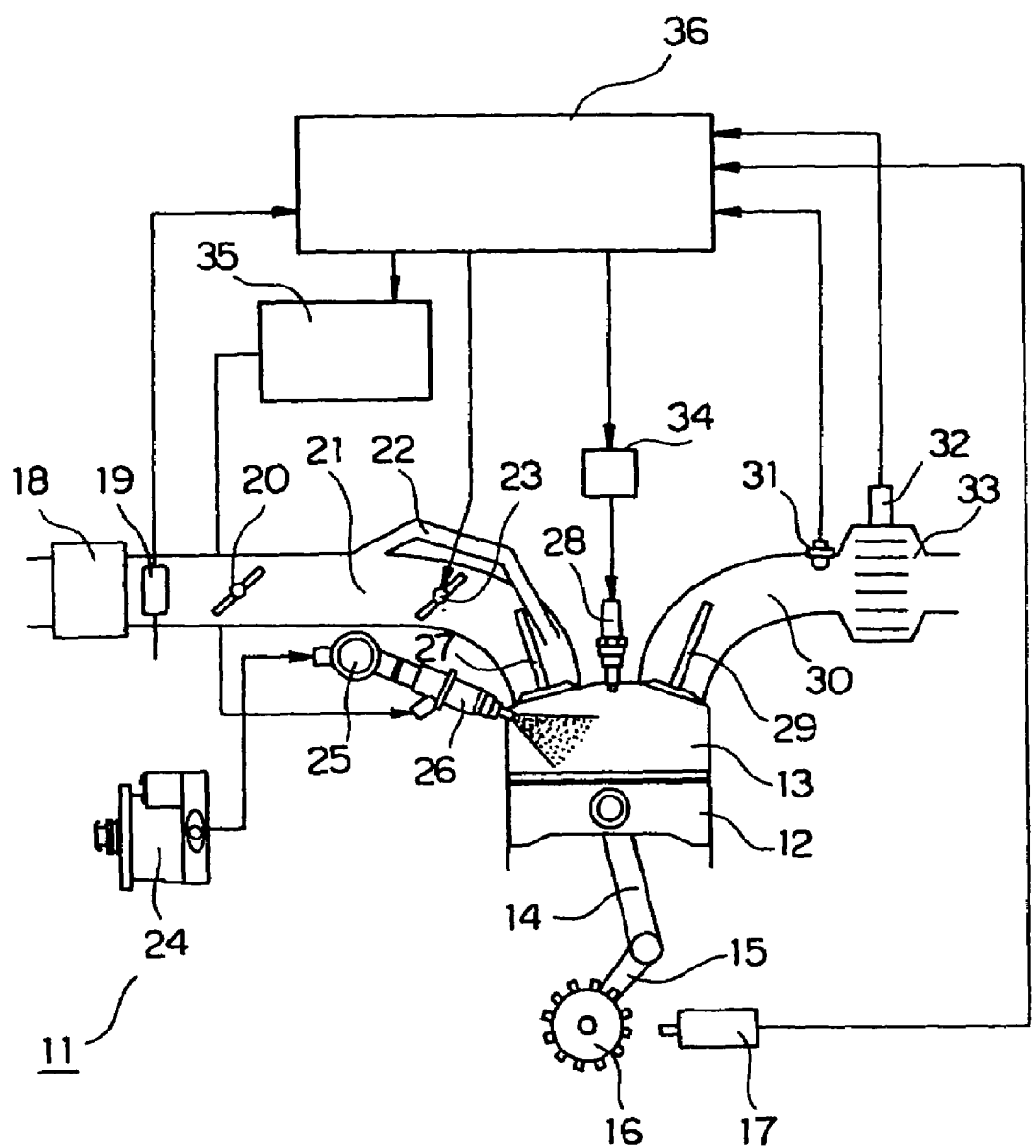
FIG. 1 is a schematic view showing an engine system.

FIG. 1 shows one example of an engine system to which the present invention is applied. An engine 11 has a crank mechanism comprising of a connecting rod 14 and a crankshaft 15, and a combustion chamber 13 is formed by a piston 12 connected to the crank mechanism and an engine head of the engine 11. The combustion chamber 13 is sealed by intake valves 27, exhaust valves 29, an ignition plug 28, and a fuel injection valve 26 which are installed on the engine head.

In the engine 11, air necessary for combustion is sucked into the combustion chamber 13 by the reciprocating motion of the piston 12. Dirt and dust contained in the air to be sucked are removed by an air cleaner 18, and an intake air amount, which is a basis for calculating a fuel injection amount, is measured by an air flow sensor 19. The intake air amount is controlled by the degree of opening of a throttle valve 20, and the air to be sucked passes through a main intake air passage 21 and a subsidiary intake air passage 22 according to the operation condition of the engine 11. A control unit 36 for controlling the engine 11 is supplied with a crank angle signal sent from crank angle sensors 16 and 17 and an acceleration stroke sent from an accelerator position sensor 38. Besides, as shown in FIG. 2, the control unit 36 is supplied with various pieces of information such as an intake air amount signal sent from the air flow sensor 19, an A/F signal sent from an air-fuel ratio sensor 31 installed in an exhaust pipe, and an exhaust catalyst temperature signal sent from a temperature sensor 32.

The control unit 36 detects the operation condition of the engine 11 based on the information such as the crank angle signal and acceleration stroke, and determines the fuel injection amount, injection timing, and ignition timing based on the operation condition. An ignition coil 34 generates a high voltage according to an ignition signal sent from the control unit 36, and produces an ignition spark by means of the ignition plug 28. A fuel injection valve drive unit 35 amplifies an injection signal sent from the control unit 36 to drive the fuel injection valve 26. Fuel is supplied from a high-pressure fuel pump 24, which is driven by the engine 11, to the fuel injection valve 26 through a fuel pipe 25.

In order to form a necessary swirl flow in the combustion chamber 13 according to the operation condition of the engine 11, the degree of opening of a flow dividing valve 23 in the main intake air passage 21 is controlled to regulate the amount of air introduced from the subsidiary intake air passage 22. To open and close the flow dividing valve, a flow dividing valve driving signal VD is sent from the control unit 36 according to the operation condition of the engine. The air passing through the subsidiary intake air passage 22 has a high speed and directivity, so that it forms a necessary swirl flow in the combustion chamber 13. By opening the flow dividing valve 23, air flows through the main intake air passage 21, and the air passing through the subsidiary intake air passage 22 lessens. Thereby, the intensity of the swirl flow formed in the combustion chamber 13 is regulated.

Figure 2:
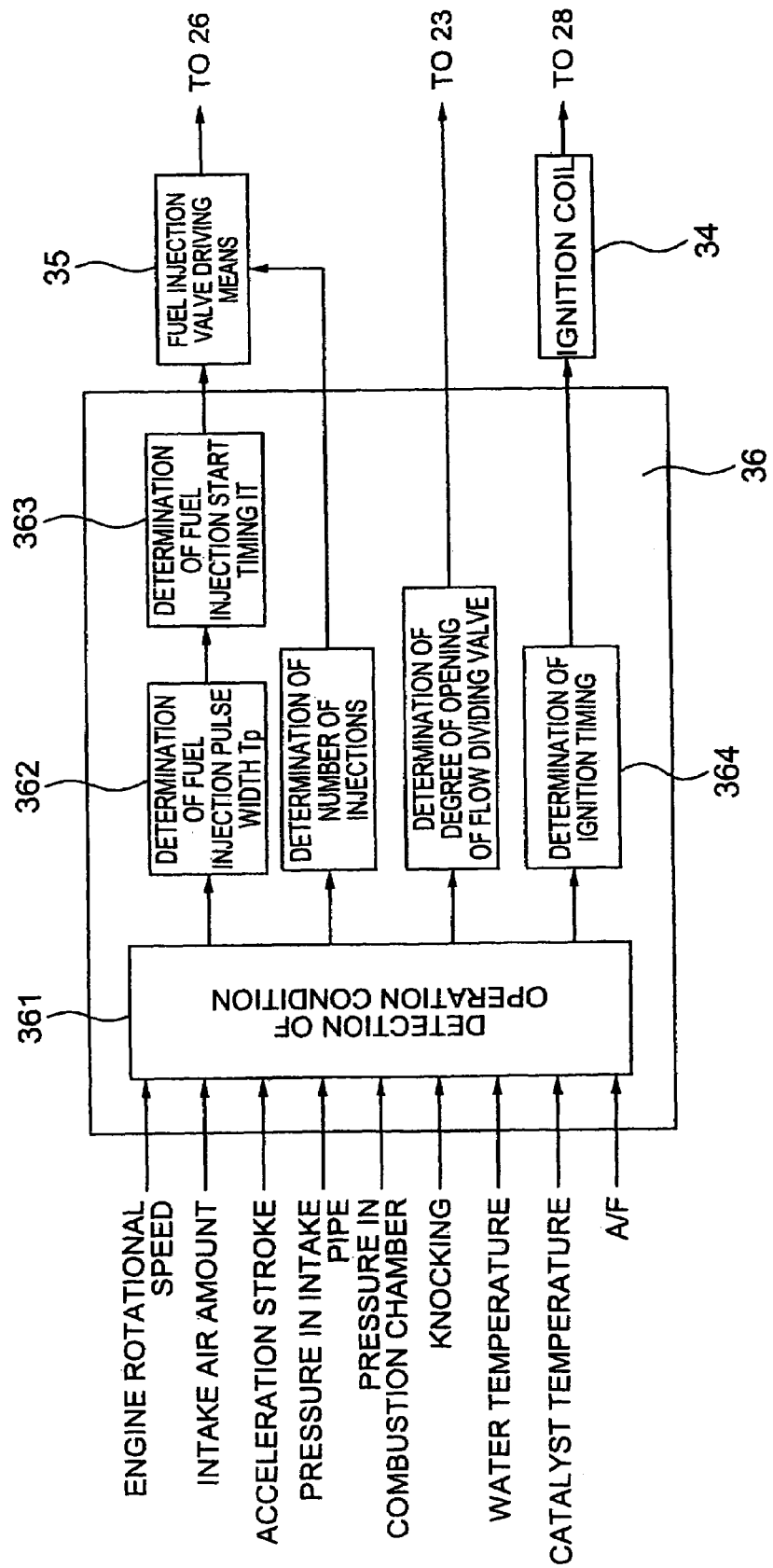
FIG. 2 is a block diagram (1)
Figure 3:
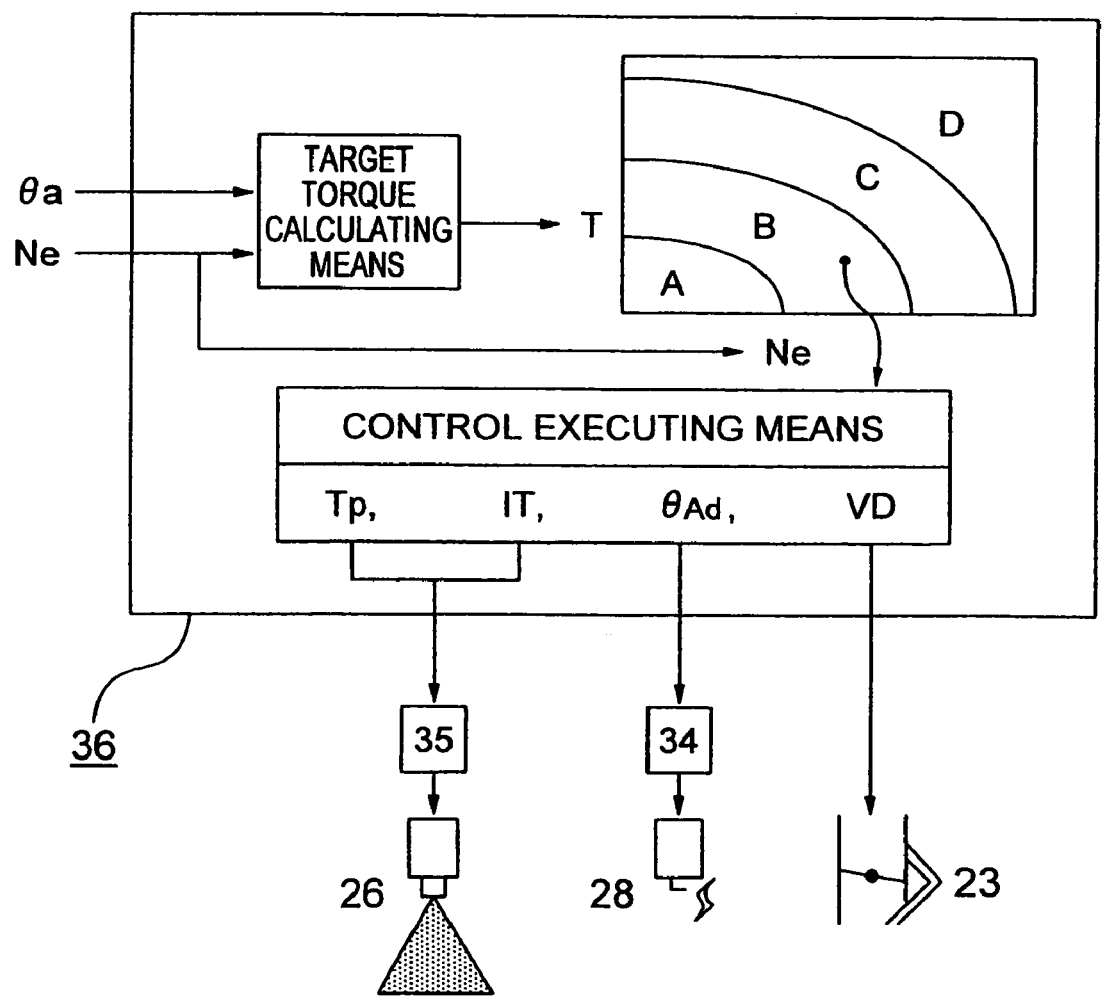
FIG. 3 is a block diagram (2)

FIGS. 2 and 3 are block diagrams showing the flow of control signals. The flow of control signals in the engine control unit 36 will be described with reference to these figures.

Figure 4:
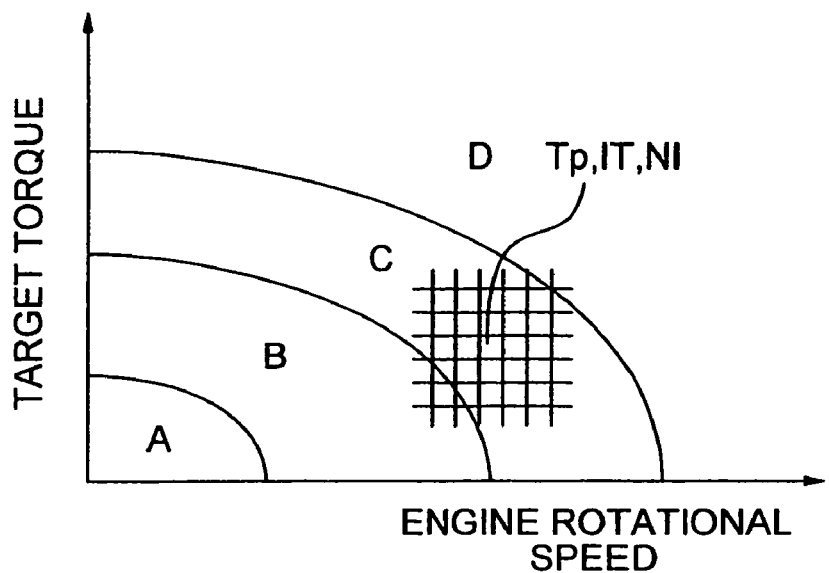
FIG. 4 is a view showing an operation region map.
Figure 4:
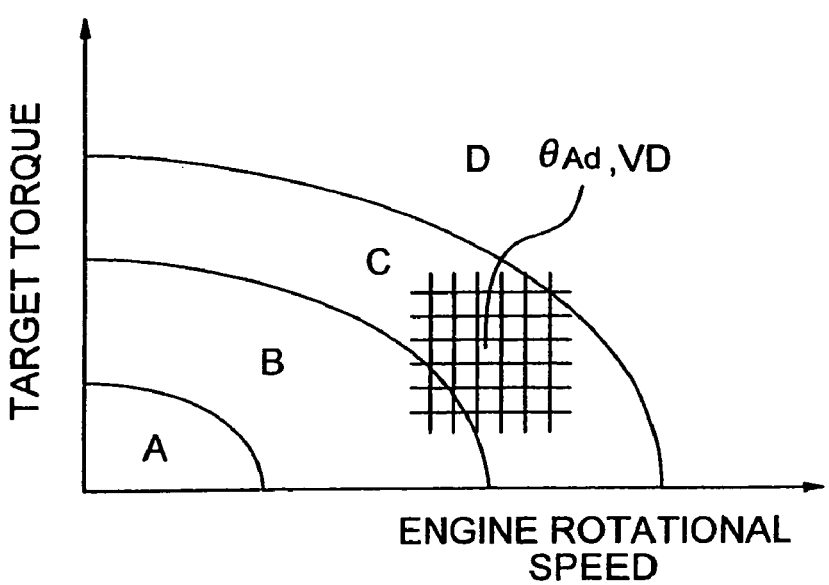
Figure 10:
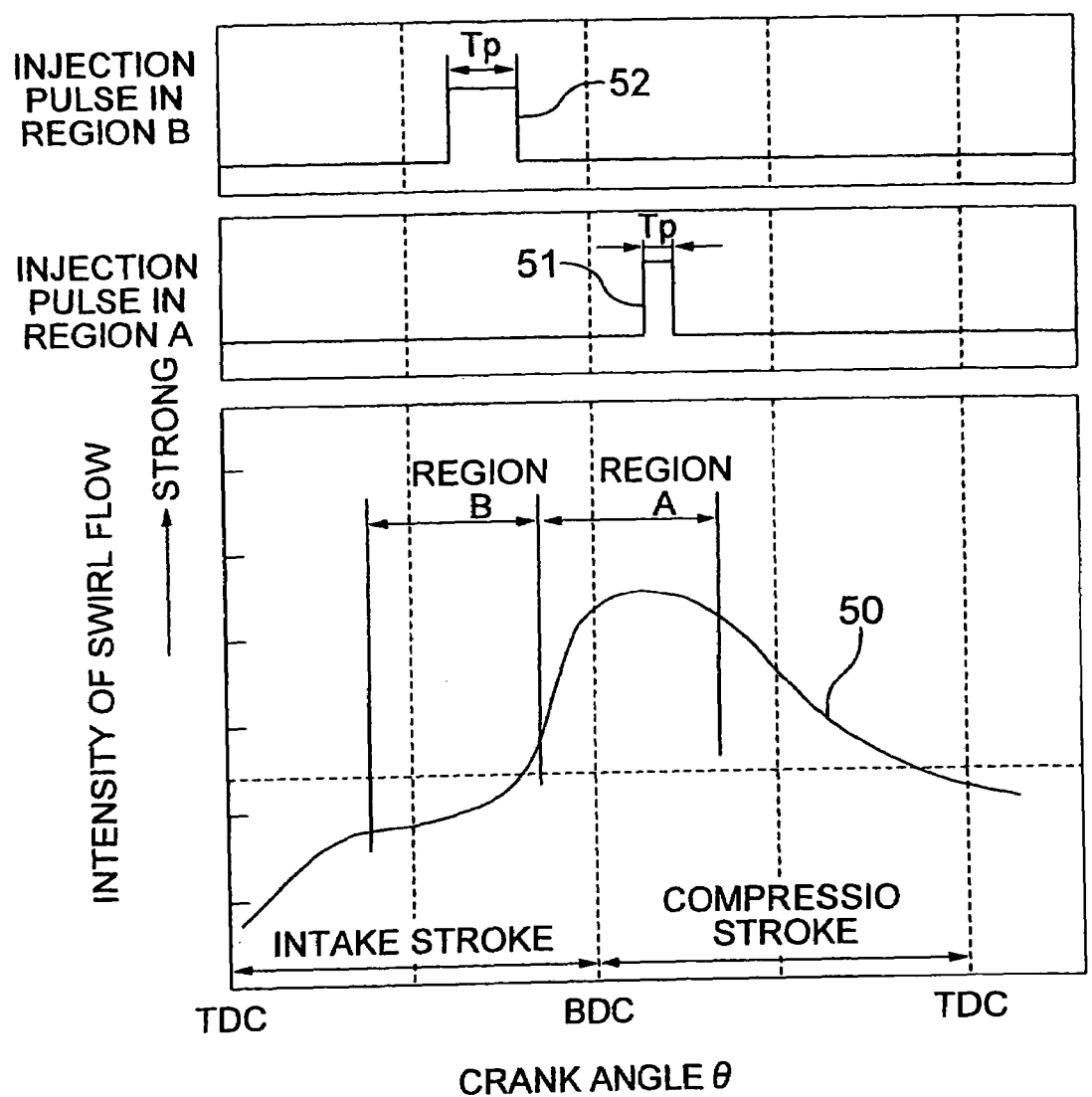
FIG. 10 is a diagram showing a control method at the time of lean burn operation.

In block 361, the crank angle signal, the acceleration stroke $\theta_\alpha$, etc. are taken and held, an engine rotational speed Ne is calculated from the crank angle signal, and a target torque T of the engine is calculated from the acceleration stroke $\theta_\alpha$ and the engine rotational speed Ne. In blocks 362, 363 and 364, a fuel injection pulse width Tp, fuel injection start timing IT, and ignition timing $\theta_{Ad}$ are determined from the engine rotational speed and the target torque held in the block 361. The fuel injection amount is substantially proportional to the fuel injection pulse width Tp. The fuel injection pulse width Tp and the fuel injection start timing IT are, as shown in FIG. 4, determined from a map of the engine rotational speed Ne and the target torque T. Signals (fuel injection valve drive signals) of the fuel injection pulse width Tp and the injection start timing IT are sent to the fuel injection valve drive unit 35. Also, in block 364, the ignition timing is determined according to the operation condition of the engine, and a signal of the ignition timing is sent to the ignition coil 34. The fuel injection start timing IT is, as shown in FIG. 10, determined during the intake stroke and the compression stroke according to the operation condition of the engine so as to correspond to the combustion system of each operation condition, and the number of injections $N_I$ is also determined (four times in FIG. 15). That is to say, the combustion method (combination of Tp, IT, $\theta_{Ad}$, etc.) in the combustion chamber 13 is changed in response to the operation condition.

In a low-load region A (running at a constant speed of 60 km/h, for example), a strong swirl flow is produced (the flow dividing valve 23 is fully closed) in the combustion chamber 13, and also fuel is injected at the second half stage of the compression stroke, by which the stratified charge lean operation with an air-fuel ratio of about 40 is performed.

In a medium-load region B (running at a constant speed of 100 km/h, for example, or slight acceleration from the region A), a weak swirl flow is produced (the flow dividing valve 23 is half opened) in the combustion chamber 13, and also fuel is injected on the intake stroke, by which the stratified charge lean operation with an air-fuel ratio of about 20 to 25 is performed.

In a high-load region C (running at a constant speed of over 120 km/h, for example, or slow acceleration from the region A), no swirl flow is produced (the flow dividing valve 23 is fully opened) in the combustion chamber 13, and fuel is injected on the intake stroke, by which the homogeneous operation with an air-fuel ratio of about 14.7 is performed.

In a region D of further high rotation and high load (running at a constant speed of 140 km/h, for example, or quick acceleration from the region A), the air-fuel ratio is made lower than 14.7.

The intensity of swirl flow includes a strong swirl flow, no swirl flow, and a weak swirl flow having an intermediate intensity therebetween.

Next, the method for lean burn operation performed in the regions A and B will be described with reference to FIG. 5.

Figure 5:
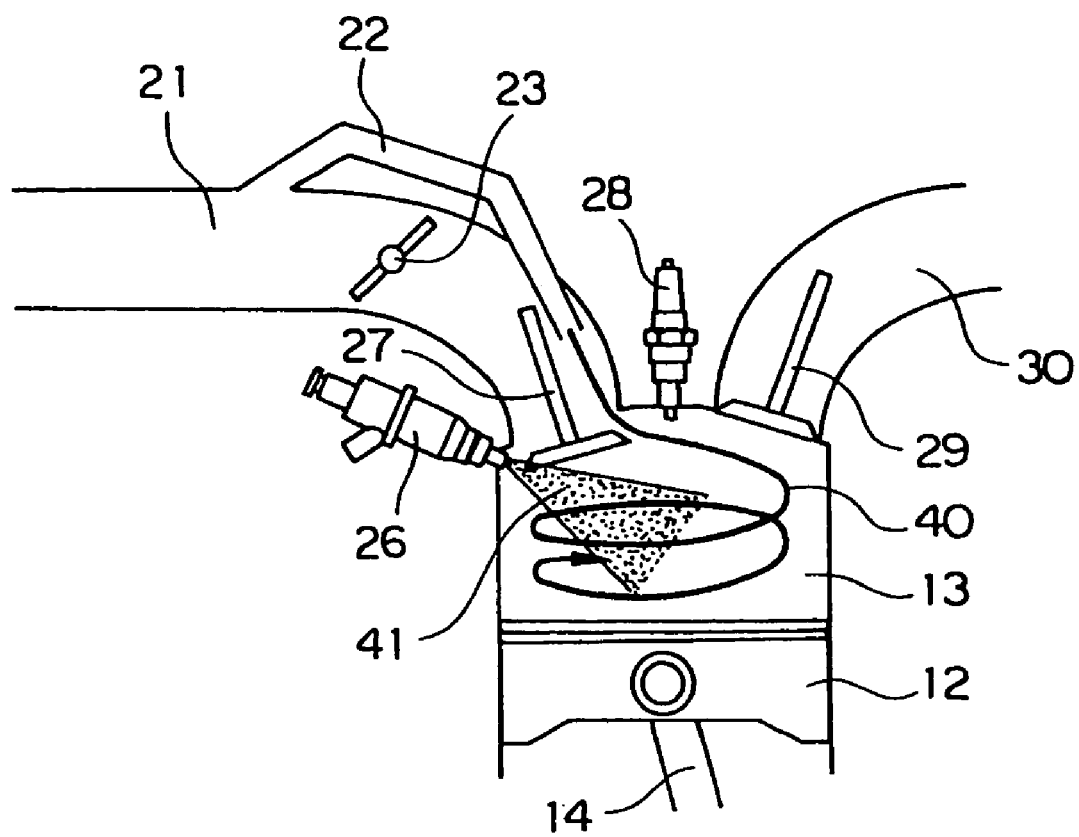
FIG. 5 is a view showing a swirl flow in a combustion chamber.
Figure 5:
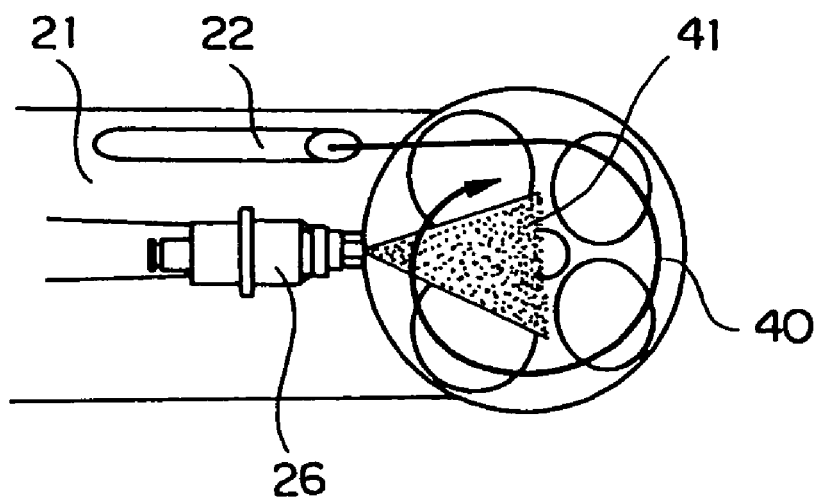

FIG. 5 shows a relationship between the swirl flow and the injected fuel spray. A swirl flow 40 generated by the main intake air passage 21, the subsidiary intake air passage 22, and the flow dividing valve 23 forms a transverse swirl flow in the combustion chamber 13.

Figure 6:
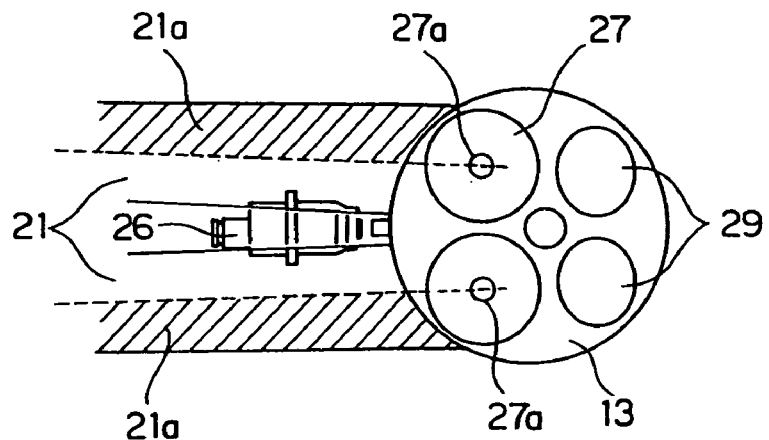
FIG. 6 is a view showing an installation position of a subsidiary intake air passage.
Figure 6:
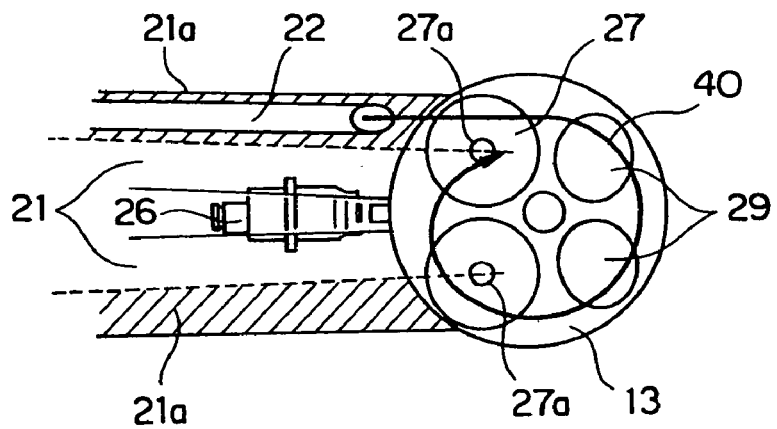
Figure 6:
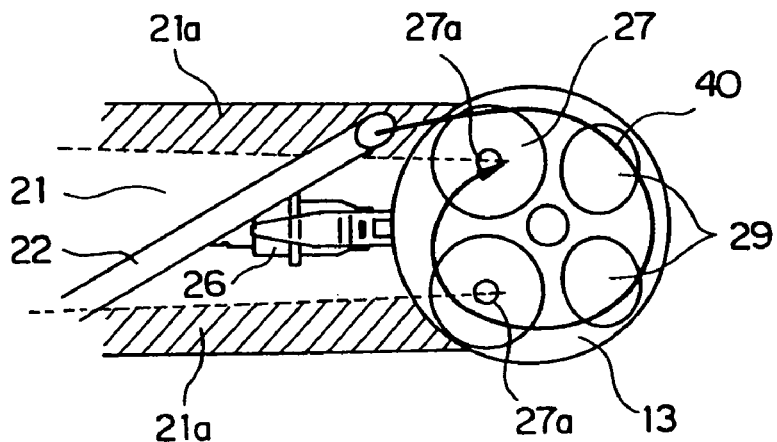

FIG. 6 shows the installation position of the subsidiary intake air passage 22.

FIG. 6(a) shows a range 21a in which the subsidiary intake air passage 22 can be installed. To provide an intake air resistance at the time of high load (C, D), the subsidiary intake air passage should preferably be installed so as to be closer to the edge of the main intake air passage 21. For this reason, the subsidiary intake air passage is installed in a range on the outside of the axis of a stem 27a of the intake valve 27.

FIG. 6(b) shows an installation method in the case where the main intake air passage 21 is divided into two portions. The subsidiary intake air passage 22 is provided at one portion of the main intake air passage 21, and the opening thereof is directed into the combustion chamber 13, by which a swirl flow as denoted by an arrow mark 40 is produced.

FIG. 6(c) shows an installation method in the case where the main intake air passage 21 is formed into one. The subsidiary intake air passage 22 is installed so as to be close to a tangential line at the outer periphery of the combustion chamber 13, and the opening thereof is directed along the wall surface in the combustion chamber 13, by which a swirl flow as denoted by an arrow mark 40 is produced.

Figure 7:
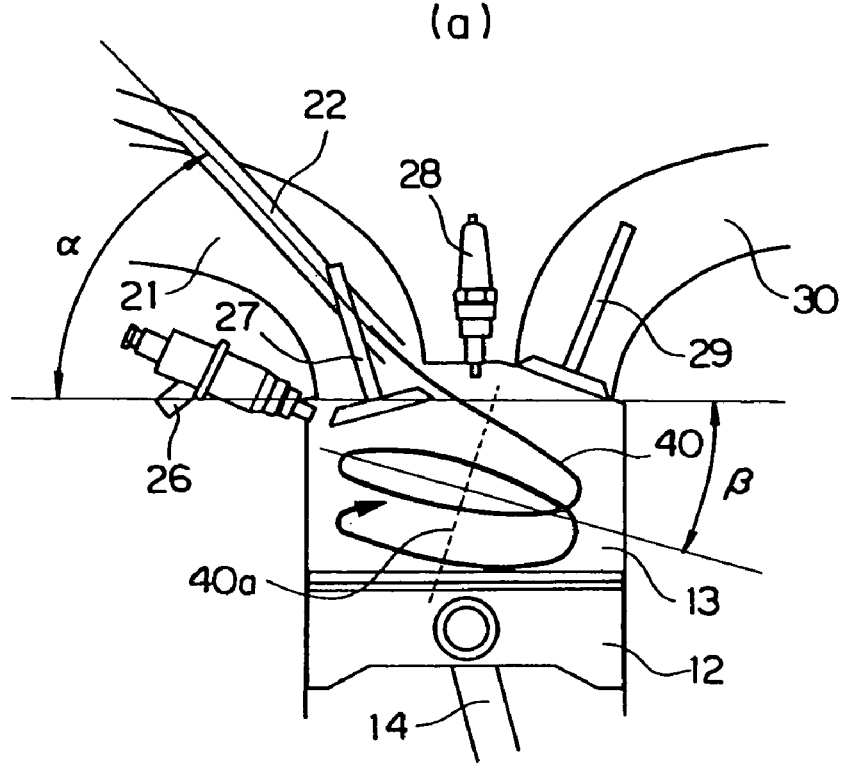
FIG. 7 is a view showing a relationship between the subsidiary intake air passage and the swirl flow.
Figure 7:
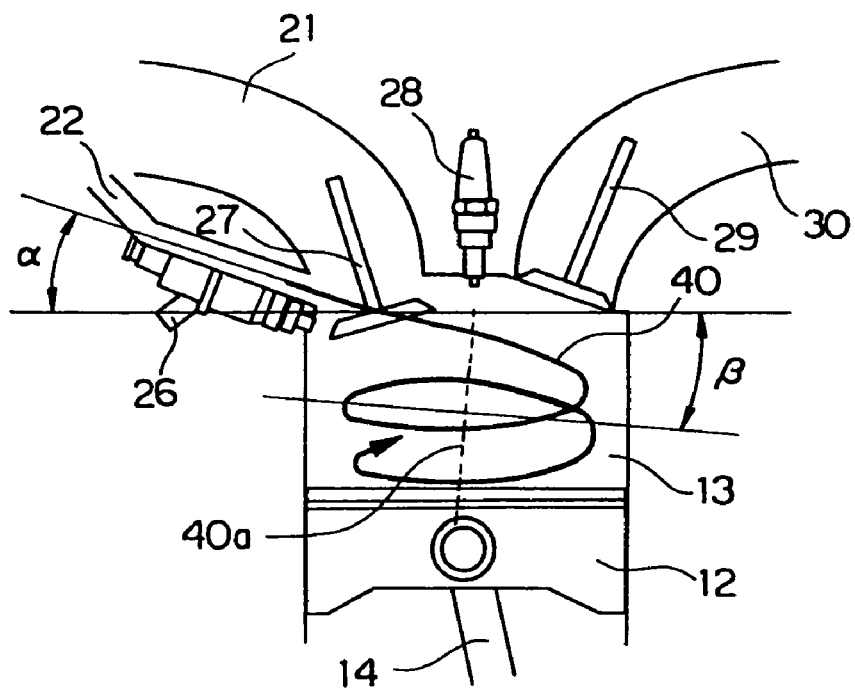

FIG. 7(a) shows a relationship between the subsidiary intake air passage 22 and the swirl flow 40 produced in the combustion chamber 13. If an angle α of the subsidiary intake air passage 22 with respect to the horizontal plane is large, a rotation axis 40a of the swirl flow 40 is tilted, with the result that the swirl flow 40 is not a horizontal vortex, but becomes a vortex having a slantwise component. In this case, the fuel component concentrated in the center of the combustion chamber is shifted from the centerline of the combustion chamber by the tilt of the rotation axis of the swirl flow.

FIG. 7(b) shows a case where the tilt angle α of the subsidiary intake air passage 22 is small. In this case, the air passing through the subsidiary intake air passage 22 flows into the combustion chamber at an angle close to the horizontal, so that the tilt of rotation axis of the swirl flow can be decreased. Thereby, the fuel component concentrated in the center of the combustion chamber can be held until the second half stage of the compression stroke.

Figure 8:
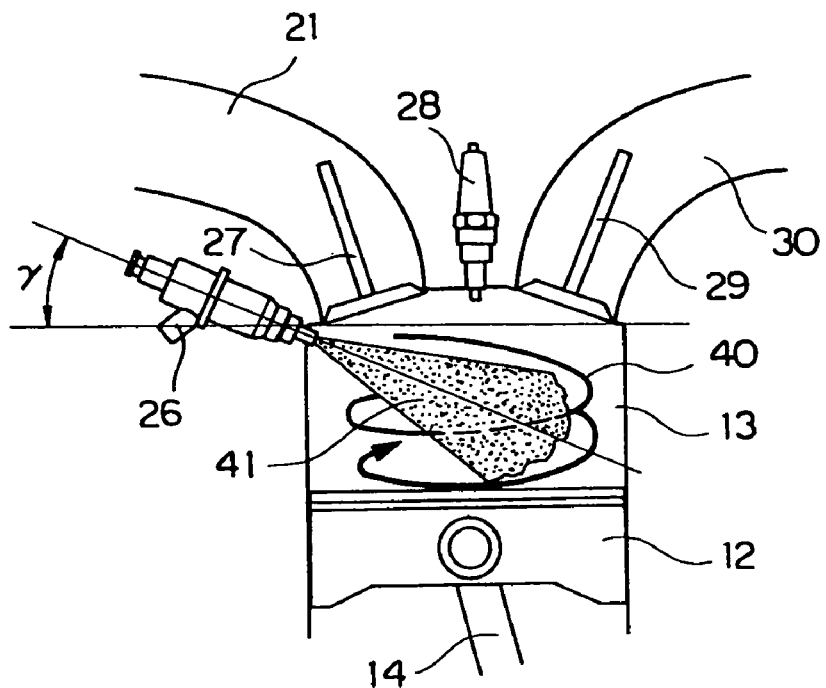
FIG. 8 is a view showing a relationship between the injection direction and the swirl flow.
Figure 8:
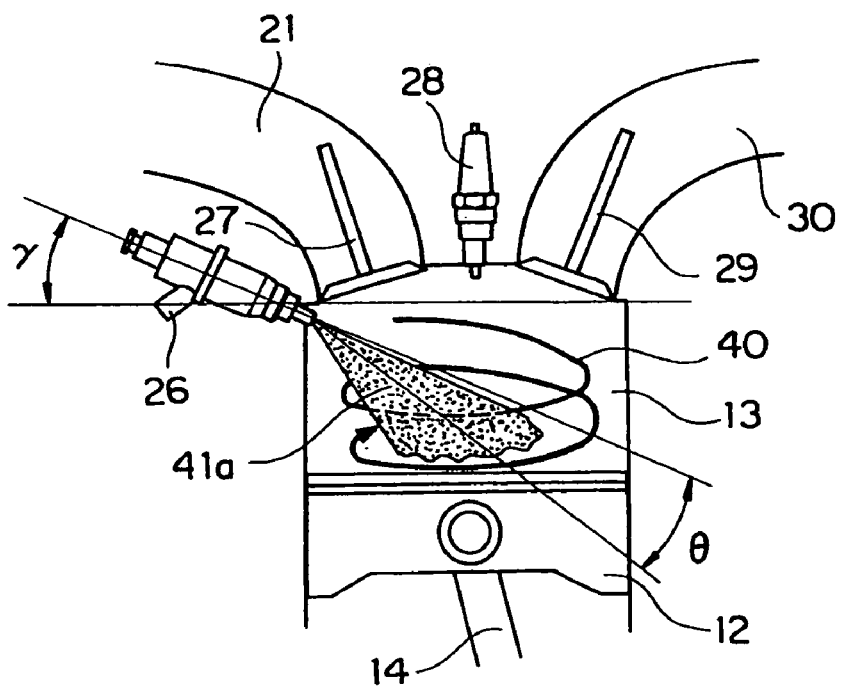

FIG. 8(a) shows a relationship between a fuel spray 41 and the swirl flow 40. As an installation angle γ (angle with respect to the horizontal plane) of the fuel injection valve 26 becomes larger, the fuel spray 41 can be held in the center of the combustion chamber more easily. If the fuel injection valve 26 is located at the installation position of the ignition plug 28, the fuel spray is surely held in the center of the combustion chamber. When the fuel injection valve is located under the intake valve as in this embodiment, it is thought that the fuel spray goes beyond the swirl flow 40 and diffuses to the peripheral portion in the combustion chamber depending on the penetration of the spray. Therefore, a condition in which the fuel spray does not go beyond the swirl flow must be considered. This condition is described later.

FIG. 8(b) shows a method in which the injection direction of the fuel spray is deflected to prevent the diffusion of the fuel spray to the peripheral portion in the combustion chamber. Since a fuel spray 41a is injected so as to be tilted through an angle θ with respect to the installation angle γ of the fuel injection valve, the fuel spray is easily taken into the swirl flow 41a. If the fuel spray is used together with a spray using an atomizer or a spray of short penetration shown in FIG. 14(b), the fuel spray can surely be held in the center of the combustion chamber.

Figure 9:
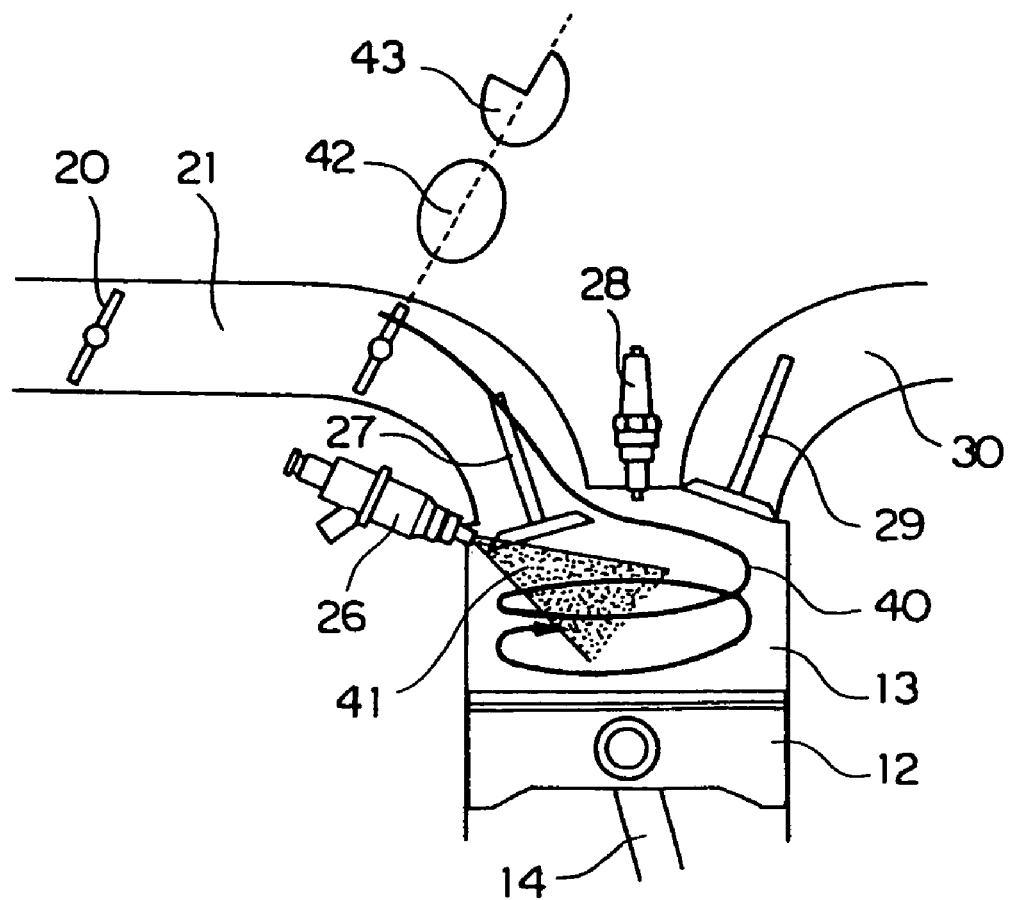
FIG. 9 is a view showing another method for producing a swirl flow.
Figure 9:
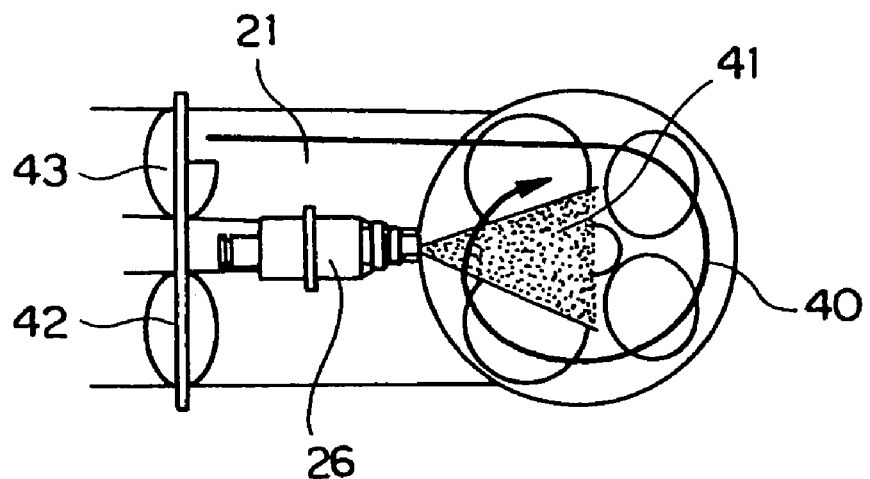

FIG. 9 shows another method for producing the swirl flow. The main intake air passage 21 is divided into two passages, a main intake air passage provided with a flow dividing valve 42 and a subsidiary intake air passage provided with a notched valve 43, to communicate with the two intake valves 27. The flow dividing valve 42 and the notched valve 43 are connected to each other by one shaft so that the degree of opening of the valves can be regulated by the rotation of the shaft. When the valves are fully closed, air is introduced only through the intake passage provided with the notched valve. Therefore, the flow velocity is increased, so that a strong swirl flow is formed in the combustion chamber 13. When the valves are fully opened, air is introduced through both the passages, so that the occurrence of the swirl flow is stopped. Although the main intake air passage and the subsidiary intake air passage are provided in FIG. 9, a construction without the subsidiary intake air passage is also possible.

In both of the above-described two methods for producing the swirl flow, the air flow velocity in the vicinity of the cylinder wall surface of the combustion chamber 13 is high, and that in the central portion is low. If fuel is injected after the first half stroke of the compression stroke (when the swirl flow is established), at which the swirl flow becomes strong, the fuel spray 41 injected to the portion near the center of the combustion chamber 13 does not diffuse, and concentrates in the swirl flow. It is important that at this time, the fuel spray 41 decelerates in the vicinity of the center of the combustion chamber, and does not arrive at the cylinder wall on the opposite side. For such a spray, the penetration thereof should preferably be 60 mm or less 3.8 msec after the fuel is injected to the atmosphere of the atmospheric pressure. Also, the spray particle size at this time should preferably be 20 μm or smaller in terms of Zauter mean particle size D32.

The Zauter mean particle size is defined as a particle size calculated from the volume and the surface area when the spray particle is assumed to be a perfect sphere. It can easily be measured by using a measuring instrument such as a Phase Doppler Particle Analyzer (PDPA) or a Malvern particle analyzer. The numeral shown in the embodiment is the Zauter mean particle size measured at a position 50 mm below the nozzle tip.

To obtain such fuel spray characteristics, an atomizer as shown in FIGS. 17 to 32 should preferably be used. The use of such an atomizer tends to weaken the penetrating force of spray. The atomizer itself will collectively be described later.

The following is a description of a case where an atomizer is used.

FIG. 10 shows a control method at the time of lean burn operation. The abscissas denote the crank angle of the engine for a period from the intake stroke to the compression stroke. The ordinates denote the intensity of the swirl flow produced in the combustion chamber. The swirl flow in the combustion chamber is affected by the degree of opening of the intake valve during the intake stroke, and becomes strongest in a period from the second half stage of the intake stroke to the first half stage of the compression stroke. Thereafter, the intensity of the swirl flow decreases.

In the region A, because the stratified charge burn operation is performed, fuel is injected as denoted by a pulse 51 when the swirl flow in the combustion chamber is established. The fuel injection amount and the injection timing are determined so that the exhaust amount of HC does not increase.

In the region B, the homogeneous lean burn operation is performed. At this time, the air-fuel ratio is 20 to 25, and fuel is injected on the intake stroke as denoted by a pulse 52 to reduce the exhaust amount of NOx. The fuel injected during the intake stroke is agitated by the swirl flow and is diffused in the combustion chamber, thereby being mixed uniformly.

Figure 11:
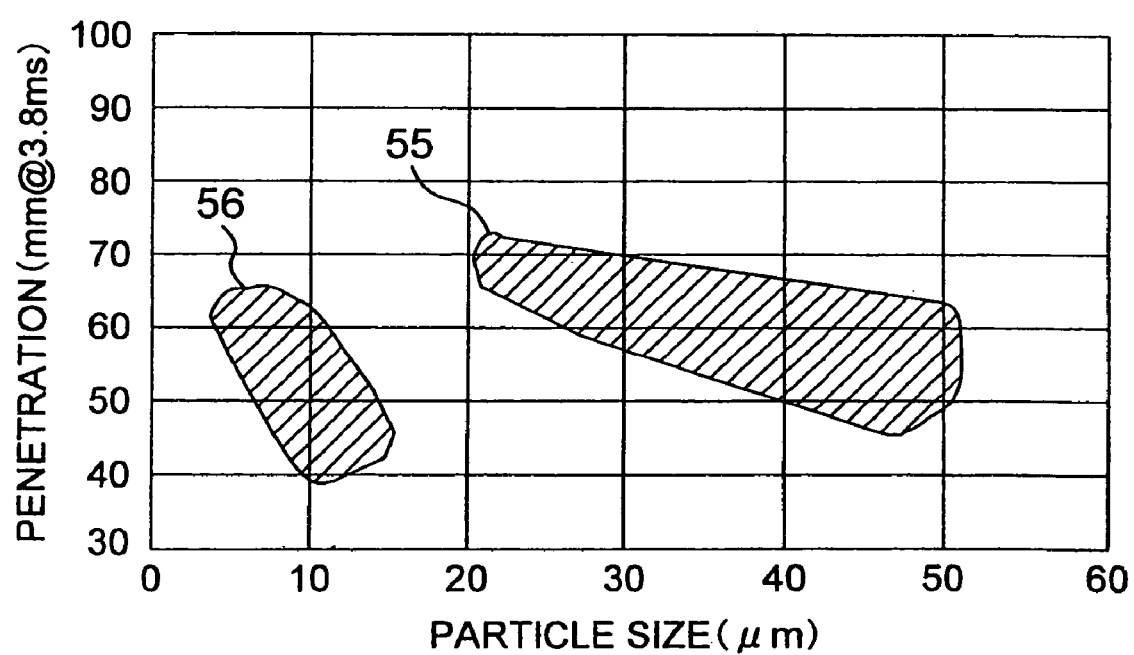
FIG. 11 is a diagram showing fuel spray characteristics.

FIG. 11 shows the fuel spray characteristics for a cylinder injection engine. The abscissas denote the average particle size of spray, usually denoted in terms of the Zauter mean particle size D32. The ordinates denote the penetration or the spray arrival distance, denoting the spray length 3.8 ms after injection. The spray characteristics of an upstream swirling type injector widely used for a direct injection engine at present fall within a range 55 by changing the fuel pressure, spray angle, and spray swirl force. With the use of an atomizer, the spray characteristics fall within a range 56, which means that the particles are made fine. However, such a spray presents a problem in that the fuel spray is caused to flow to the intake air at the time of full-open output, so that the mixture becomes nonuniform.

Figure 12:
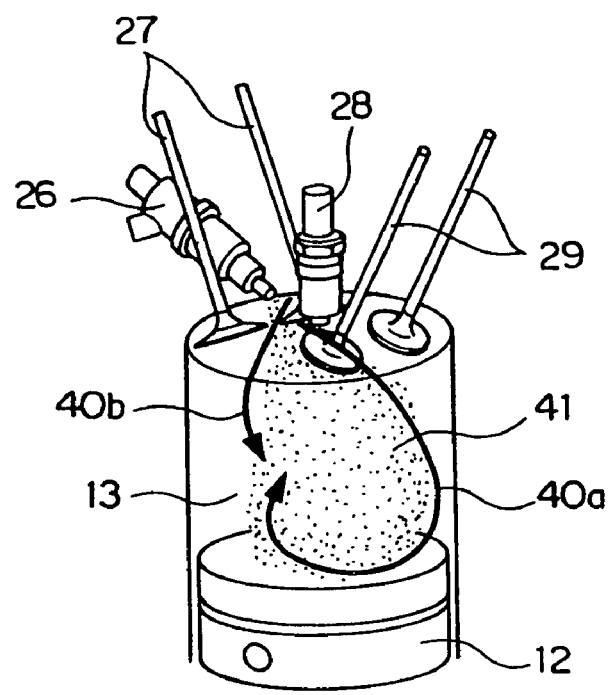
FIG. 12 is a view showing the outline of the observation result of spray behavior.
Figure 12:
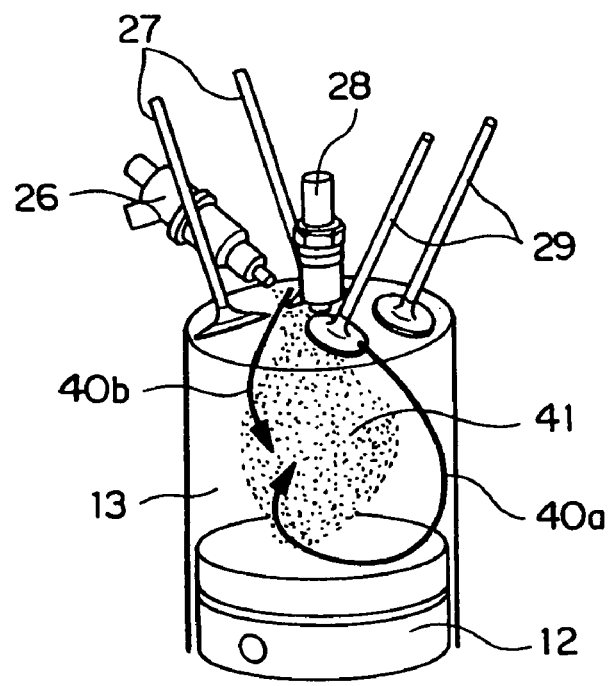

FIG. 12 shows the outline of the observation result of spray behavior in the combustion chamber of the engine. FIG. 12(a) shows a case where the penetrating force of spray is strong, and FIG. 12(b) shows a case where the penetrating force of spray is weak. At the time of high load, the operation of the swirl flow generating means is stopped, that is, the flow dividing valve is opened fully. Thereby, the intake air amount is increased. Vertical swirl flows 40a and 40b are produced in the combustion chamber 13 by the flow passing through the upper side of the intake valve and the flow passing through the lower side thereof. The swirl flow 40a is an air flow having passed through the upper side of the intake valve, and the swirl flow 40b is a flow having passed through the lower side thereof. In the case shown in FIG. 12(a) where the penetrating force of spray is strong, the fuel spray is spread in the cylinder by the penetrating force of the spray itself, so that it is diffused uniformly in the cylinder by going with the flow of the air flow 40a, by which satisfactory combustion can be provided. If such satisfactory combustion can be provided, the output can be taken out with a high efficiency with respect to the supplied fuel. However, in the case shown in FIG. 12(b) where the penetrating force of spray is weak, the fuel spray is caused to flow by the flow of the air flow 40b, so that it cannot be diffused widely in the cylinder, by which a problem is caused in that the distribution of mixture becomes nonuniform (not homogeneous). Therefore, the injection timing is contrived as shown in FIG. 13.

Figure 13:
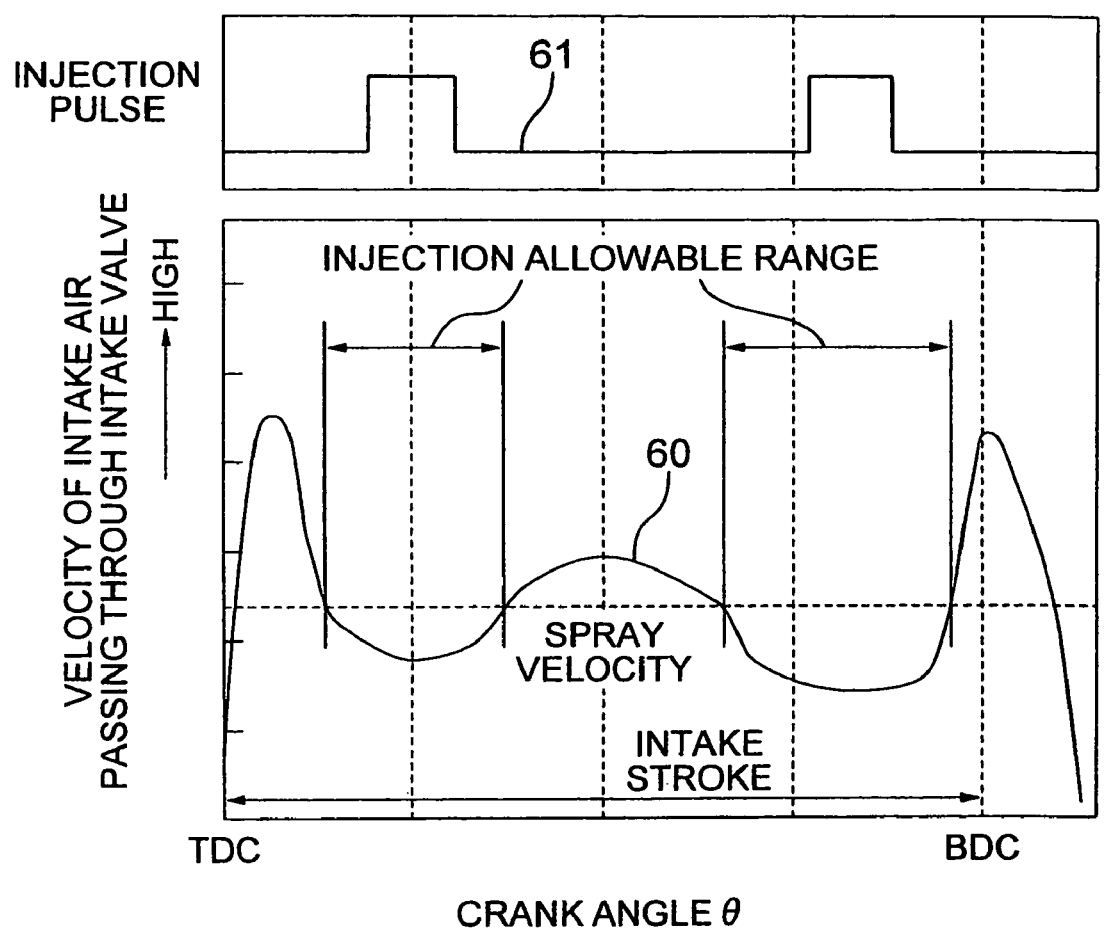
FIG. 13 is a diagram showing a relationship between intake air velocity and injection pulse at the time of full-open operation.

FIG. 13 shows a relationship between intake air velocity and injection pulse at the time of high load. The abscissas denote the crank angle of the engine on the intake stroke. The ordinates denote the approximate velocity of the intake air passing through the opened area of the intake valve. Since the opened area of the intake valve is first small, the velocity is high, and thereafter decreases. At the middle stage of the intake stroke, the intake air amount increases, so that the velocity increases again. Subsequently, the velocity decreases again, and increases before the intake valve is closed. Thereafter, the intake valve is closed. Since the charge efficiency in natural intake is about 70 to 80%, there is still a margin of intake, and the flow velocity is high even immediately before the intake valve is closed. In a spray with the spray characteristics using an atomizer denoted by the region 56 in FIG. 11, the spray velocity is low (the penetrating force is weak), so that the spray is easily caused to flow by the intake air. If the spray velocity is higher than the intake air velocity, the spray is prevented from being caused to flow by the intake air flow. The spray velocity depends on the nozzle construction and the fuel pressure, and is independent of the engine rotational speed. Therefore, if fuel is injected at the above-described timing at which the intake air velocity changes and becomes lower than the spray velocity, the influence of the intake air on the spray can be reduced. Since the intake air velocity changes as denoted by a curve 60, the period of time when the intake air velocity becomes lower than the spray velocity determined by the nozzle construction and the fuel pressure provides the injection allowable range. By carrying out control in this manner, the injected fuel can be prevented from being deflected, so that a homogeneous mixture can be formed. When the injection allowable range is narrow and a necessary amount of fuel cannot be injected at a time, fuel can be injected additionally as denoted by reference numeral 61.

The spray velocity is a velocity of fuel spray when the fuel spray is injected from the fuel injection valve into the atmospheric air. This spray velocity can be calculated by measuring the length from the tip end of the fuel injection valve to the tip end of the spray every unit time when the fuel spray is photographed by a high-speed camera. Also, the intake air velocity is a flow velocity of intake air when the intake air passes through the opening of the intake valve, and is changed by the degree of opening of the valve. Therefore, in order to measure the intake air velocity, a steady-state air flow is supplied to the engine head, and the degree of opening of the valve is changed, by which the intake air velocity is measured by using a hot wire flow velocity meter or the like.

Figure 14:
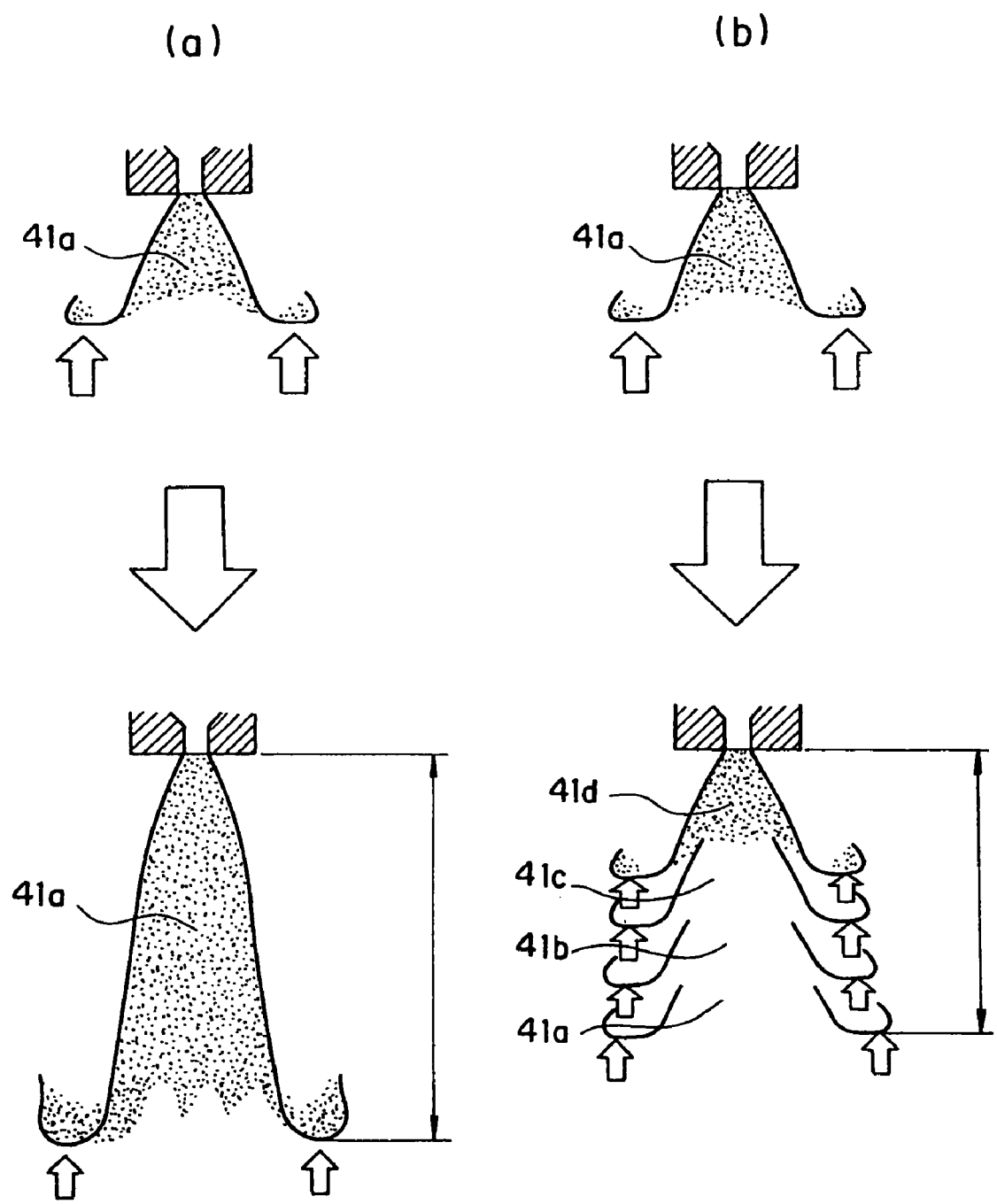
FIG. 14 is a view showing a comparison between single injection and divided injection.
Figure 15:
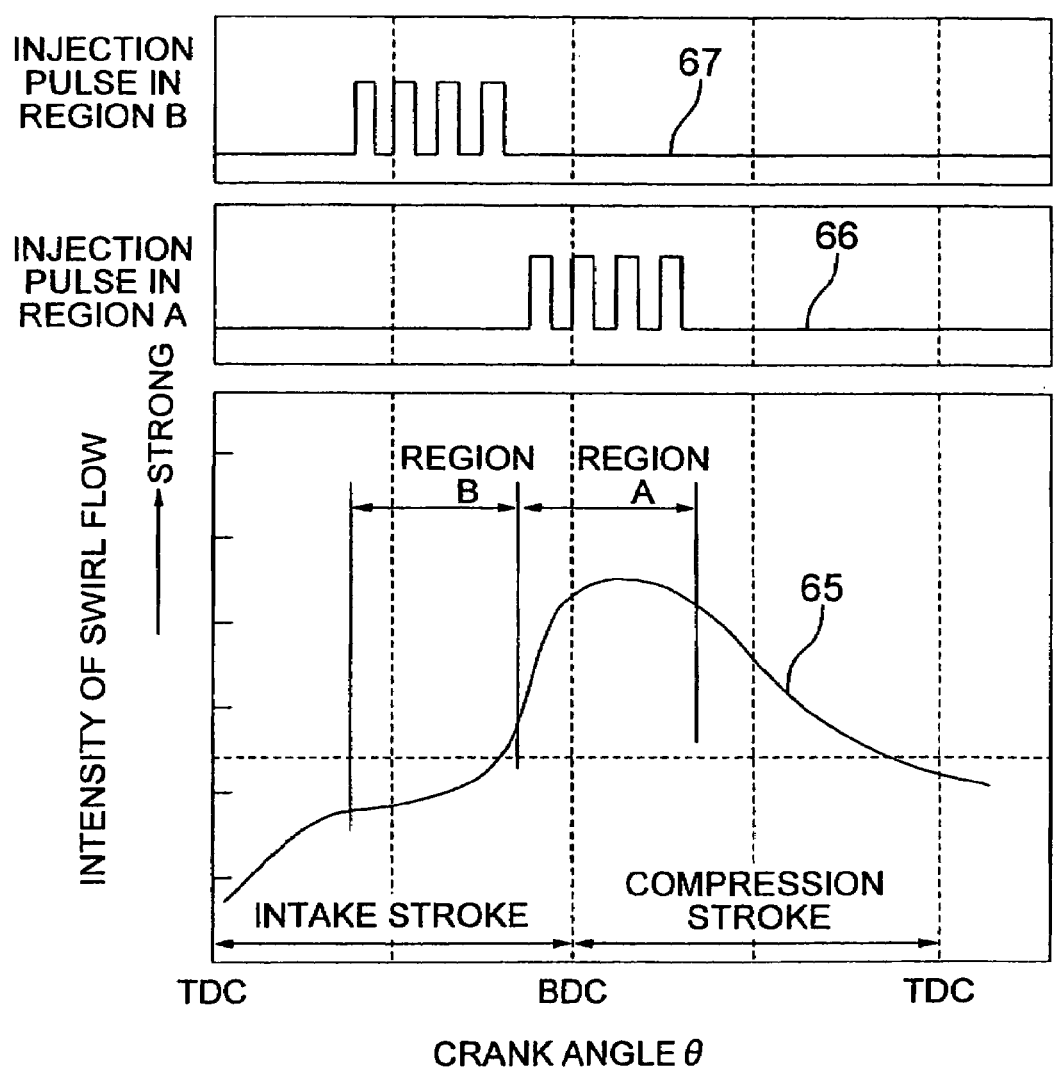
FIG. 15 is a diagram showing a relationship between the intensity of swirl flow and the injection pulse.
Figure 16:
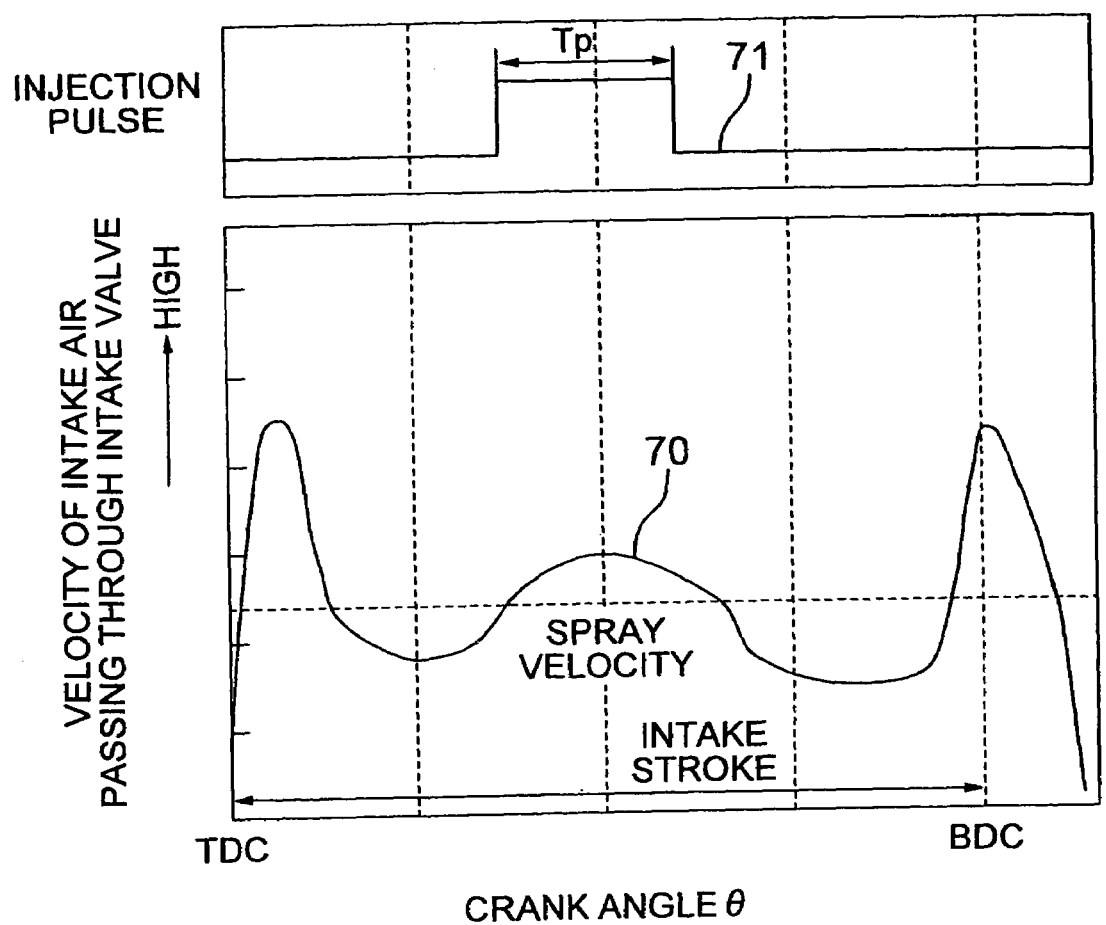
FIG. 16 is a diagram showing a relationship between intake air velocity and injection pulse at the time of full-open operation.

FIGS. 14 to 16 show the embodiment in which no atomizer is used and an upstream swirling type injector is used. This corresponds to a case where the penetrating force of spray is strong.

FIG. 14(a) shows a state in which a spray grows when fuel is injected by one injection using the upstream swirling type injector. The tip end portion of a spray 41a is subjected to air resistance, and decelerates gradually. However, since the spray is injected continuously, the spray is carried away by the subsequently injected spray, so that the penetration becomes long. The penetration at this time is in the range of the spray characteristics 55 shown in FIG. 11.

FIG. 14(b) shows a case where the same injection amount is injected at four times. The first injected spray 41a is subjected to air resistance and decelerates. The fuel is injected at multiple stages, so that the penetration becomes short because the spray 41a is not carried away continuously. Subsequently injected sprays 41b, 41c and 41d are also subjected to the same operation, so that the penetration of the whole spray becomes shorter than the case where the fuel is injected at a time.

FIG. 15 shows a relationship between the intensity of swirl flow in the combustion chamber and the injection pulse. In a region A where stratified charge combustion is produced, fuel is injected when the swirl flow is established. At this time, since the penetration is shortened by the divided injection, the fuel spray is contained in the swirl flow, so that it can be prevented from diffusing. In a region B where homogeneous lean operation is performed, fuel is injected before the swirl flow is established so that the injected fuel is mixed uniformly. At this time as well, the penetration is decreased by divided injection of fuel, whereby the fuel spray can be prevented from sticking to the piston and the cylinder wall.

FIG. 16 shows a relationship between intake air velocity and injection pulse at the time of a high load (C, D). Since a stronger penetrating force of spray provides proper mixing with air at the time of a high load, the divided spray is stopped, and the injection timing is set as denoted by reference numeral 71 so that the intake air amount is increased most by intake air cooling, whereby the output can be increased.

As described above, by changing the combustion method in the combustion chamber 13 according to the operation condition, a problem can be overcome in that fuel sticks to the piston and thereby the exhaust amount of HC is increased in the regions A and B where the lean burn operation is performed. Also, the mixture distribution in the combustion chamber is made uniform in the regions C and D where the homogeneous operation is performed, whereby the output can be increased. At this time, the penetration can be shortened by employing an atomizer or a divided injection. A stratum of air is formed between the shortened penetration and the top face of piston, thereby restraining the sticking of fuel. Also, if a stratum of air flow is positively formed on the top face of piston and on the wall surface in the combustion chamber by using the swirl flow, the sticking of fuel can be reduced further. By forming the stratum of air or the stratum of air flow in this manner, the adhesion of fuel to the piston can be reduced. As a result, unburned components of fuel can be reduced, and the cooling operation of piston can be decreased. The stratum of air flow is formed more easily when a flat piston without cavity is used than when a piston with cavity is used. Also, the fuel spray is atomized and is made liable to be affected by the swirl flow, by which the fuel spray can be maintained in the swirl flow to provide stable and proper combustion.

When the engine control unit 36 is supplied with intake air amount $Q_a$ or intake pipe pressure P and air-fuel ratio A/F in addition to the crank angle signal and the acceleration stroke, feedback control can be carried out so that the air-fuel ratio A/F has a constant value (for example, 14.7) to control the engine torque so as to be the target torque. Also, when the control unit 36 is supplied with combustion chamber pressure or knock sensor signal, the occurrence of knocking is detected and can be used for the control of ignition timing. Also, if the control unit 36 is supplied with water temperature, control for delaying the ignition timing can be carried out to warm up the engine at an early time.

FIGS. 17 to 32 show tip end shapes of a fuel injection valve using an atomizer comprising of a multilayer plate. The basic configuration comprises several thin plates with a thickness of 0.1 to 0.5 mm lapped on one another, each plate being machined as shown in the figures. A first layer of the multilayer plate has an operation such that fuel is spread transversely and the penetrating force of fuel is decreased. The shapes of holes in the plates of a second and subsequent layers serve for controlling the spray shape and for atomization. Also, one plate with a thickness of 1.0 to 1.5 mm is drilled from both sides by laser beam machining or electrical discharge machining, by which a fuel passage hole similar to the fuel passage hole extending from the top face of the multilayer plate to the side thereof can be formed. Reference numeral 2 in the figures denotes a nozzle for the fuel injection valve, which has a single hole 1. To the tip end thereof is attached a multilayer plate of a variety of shapes.

The material of the multilayer plate is preferably a stainless steel, and the several plates are preferably joined by welding. Also, as an alternative method, silicon wafers processed by etching can be joined with an adhesive to produce the multilayer plate.

Figure 17:
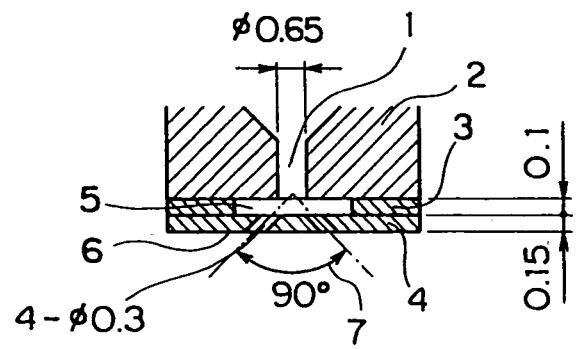
FIG. 17 is a block diagram of a four-hole diffusion type nozzle.
Figure 17:
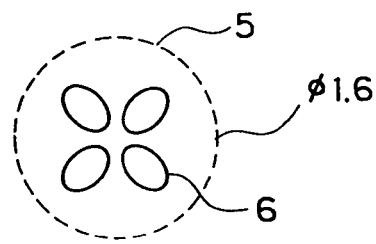

FIG. 17 shows a four-hole diffusion type multilayer plate. The fuel flowing out of the nozzle hole 1 spreads transversely in an intermediate chamber 5 formed in a plate 3, and ejects from ejection holes 6 formed in a plate 4. Although the plate formed with four ejection holes is shown, two or more holes may be formed. The ejection holes have an angle denoted by an arrow mark 7 so that fuel is ejected to the outside. Therefore, the ejected fuels do not collide with each other.

Figure 18:
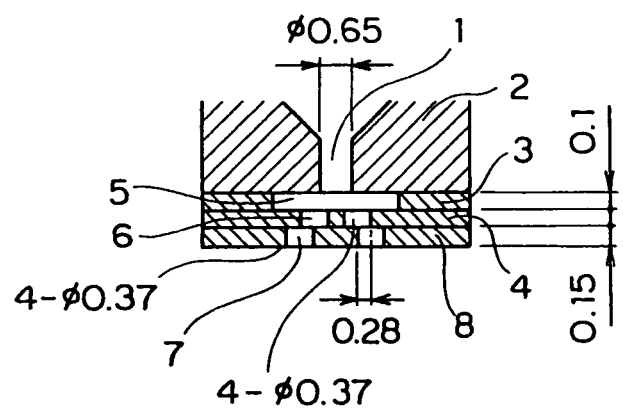
FIG. 18 is a block diagram of a hole position shifting type nozzle.
Figure 18:
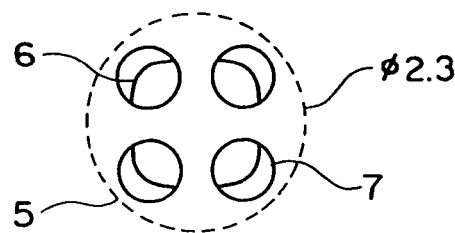

FIG. 18 shows a hole position shifting type multilayer plate. The fuel flowing out of the nozzle hole 1 spreads transversely in an intermediate chamber 5 formed in a plate 3, passes through ejection holes 6 formed in a plate 4, and ejects from ejection holes 7 formed in a plate 8. Although the plate formed with four ejection holes is shown, two or more holes may be formed. The ejection holes 6 and 7 are arranged so as to shift from each other, and the sum of the opening area thereof is determined so as to be equal to or smaller than the cross sectional area of the single hole 1.

Figure 19:
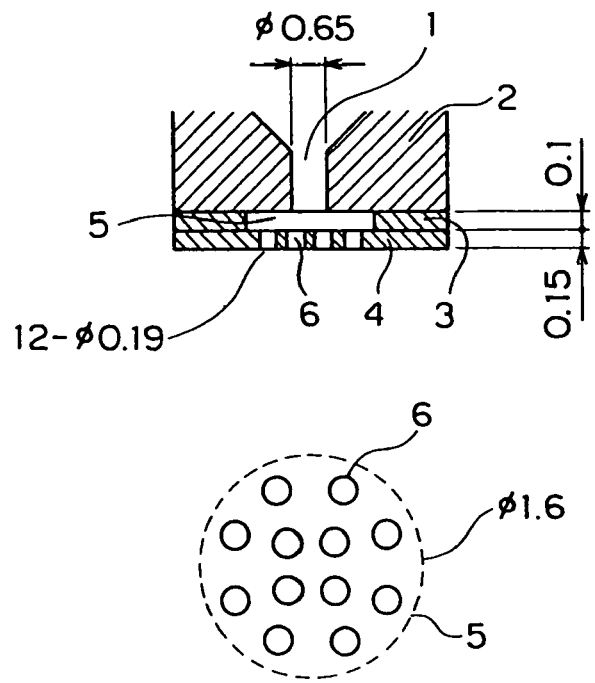
FIG. 19 is a block diagram of a multi-hole type nozzle.

FIG. 19 shows a multi-hole type multilayer plate. The fuel flowing out of the nozzle hole 1 spreads transversely in an intermediate chamber 5 formed in a plate 3, and ejects from ejection holes 6 formed in a plate 4. Although the plate formed with twelve ejection holes is shown, two or more holes may be formed. Also, although the ejection hole 6 is formed in parallel with the nozzle axis, the ejection hole may be inclined.

Figure 20:
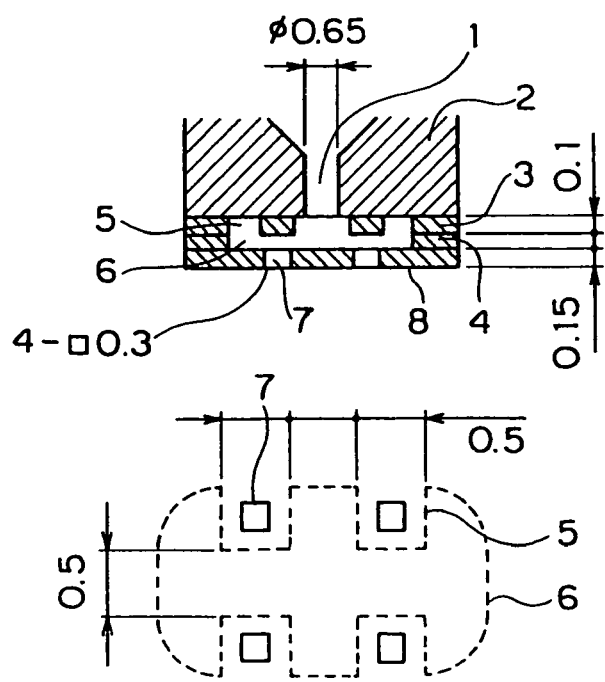
FIG. 20 is a block diagram of a flow path change type nozzle.

FIG. 20 shows a flow path change type multilayer plate. The fuel flowing out of the nozzle hole 1 spreads transversely in intermediate chambers 5 and 6 formed in plates 3 and 4, respectively, and ejects from ejection holes 7 formed in a plate 8. Although the plate formed with four ejection holes is shown, two or more holes may be formed. The intermediate chamber formed in the plate 4 has a shape denoted by reference numeral 6, and the intermediate chamber formed in the plate 3 has a shape such that projecting portions as denoted by reference numeral 5 are added to the shape of reference numeral 6. The ejection holes 7 formed in the plate 8 are located at positions under the projecting portions, so that the fuel flowing out of the nozzle hole 1 does not arrive at the ejection holes 7 directly, and is ejected after the flow path is changed in the intermediate chambers 5 and 6. By changing the flow path in the intermediate chambers, turbulence energy is given to the fuel.

Figure 21:
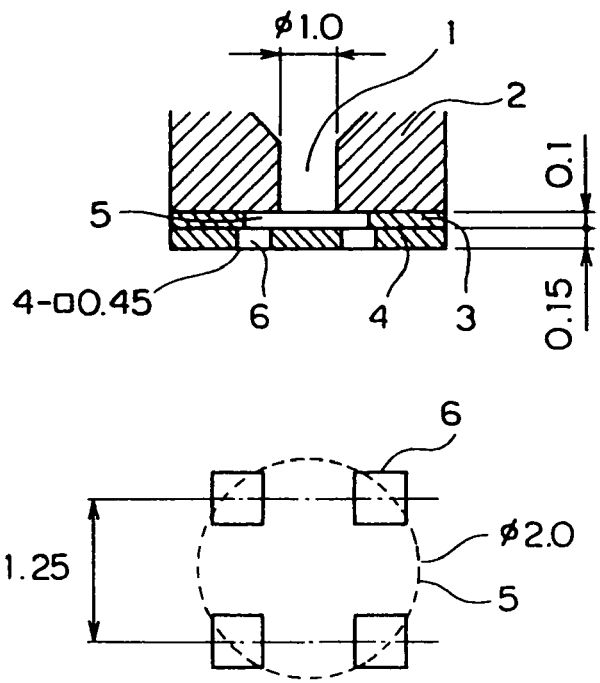
FIG. 21 is a block diagram of a fuel swirl type nozzle having square holes.

In FIG. 21, the fuel flowing out of the nozzle hole 1 spreads transversely in an intermediate chamber 5 formed in a plate 3, and ejects from square ejection holes 6 formed in a plate 4. In the case of this nozzle, the effect of fuel atomization is larger when the fuel flowing through the nozzle hole 1 is swirled.

Figure 22:
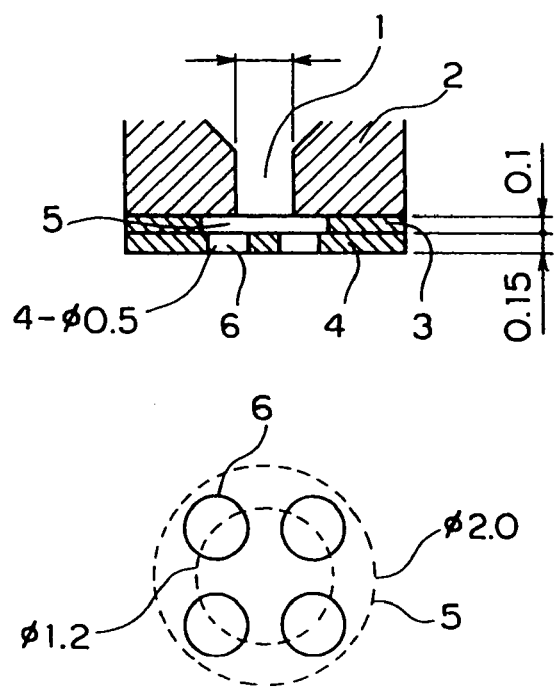
FIG. 22 is a block diagram of a fuel swirl type nozzle having round holes.

In FIG. 22, the fuel flowing out of the nozzle hole 1 spreads transversely in an intermediate chamber 5 formed in a plate 3, and ejects from ejection holes 6 formed in a plate 4. Although the plate formed with four ejection holes is shown, two or more holes may be formed. In the case of this nozzle as well, the effect of fuel atomization is larger when the fuel flowing through the nozzle hole 1 is swirled.

Figure 23:
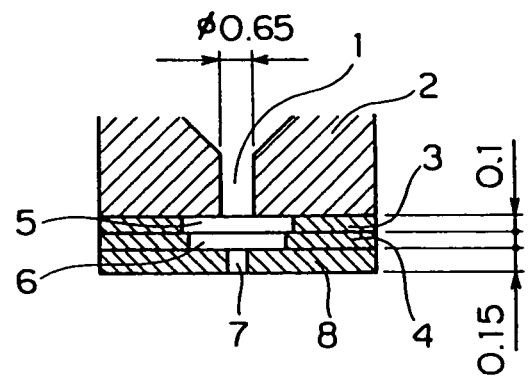
FIG. 23 is a block diagram of a slit type nozzle.
Figure 23:
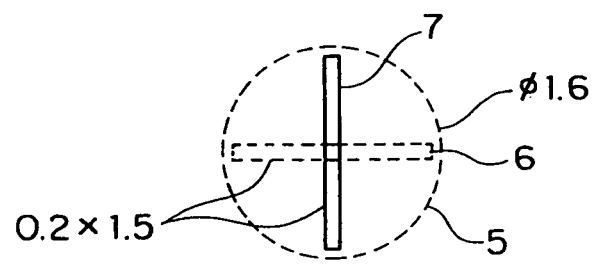

FIG. 23 shows a slit type multilayer plate. The fuel flowing out of the nozzle hole 1 spreads transversely in an intermediate chamber 5 formed in a plate 3, passes through a slit 6 formed in a plate 4, and ejects from a slit 7 formed in a plate 8. The fuel flowing from the slit 6 into the slit 7 ejects after once spreading transversely in the slit 7. Therefore, the ejected fuel spray has a very thin film shape. The crossing angle between the slits is preferably 90 degrees.

Figure 24:
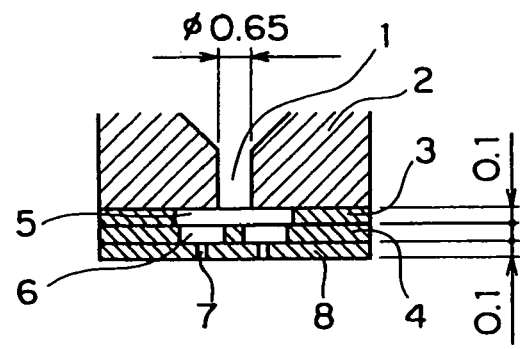
FIG. 24 is a block diagram of a four-hole slit type nozzle.
Figure 24:
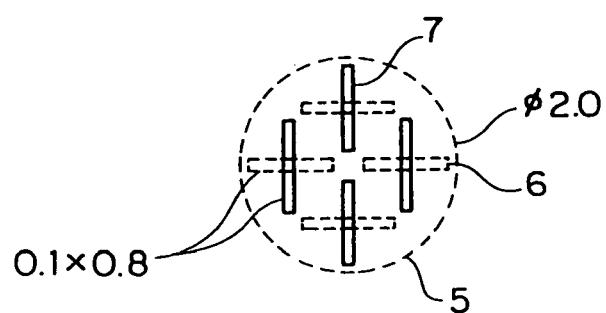

FIG. 24 shows a four-hole slit type multilayer plate. This type was derived based on the same concept as that of the slit type shown in FIG. 12. The fuel flowing out of the nozzle hole 1 spreads transversely in an intermediate chamber 5 formed in a plate 3, passes through four slits 6 formed in a plate 4, and ejects from four slits 7 formed in a plate 8. The fuel flowing from the slit 6 into the slit 7 ejects after once spreading transversely in the slit 7. The crossing angle between the slits is preferably 90 degrees.

Figure 25:
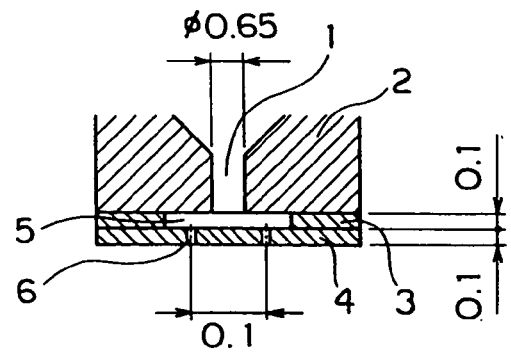
FIG. 25 is a block diagram of another four-hole slit type nozzle.
Figure 25:
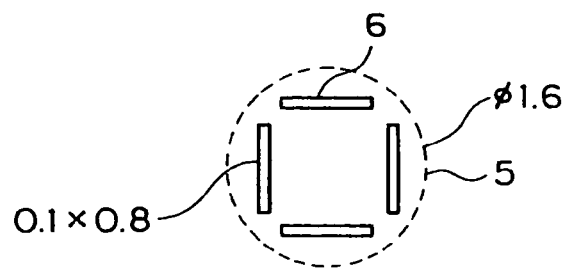

FIG. 25 shows a four-hole slit type multilayer plate. The fuel flowing out of the nozzle hole 1 spreads transversely in an intermediate chamber 5 formed in a plate 3, and ejects from slits 6 formed in a plate 4. In case of this nozzle, the effect of fuel atomization is larger when the fuel flowing through the nozzle hole 1 is swirled.

Figure 26:
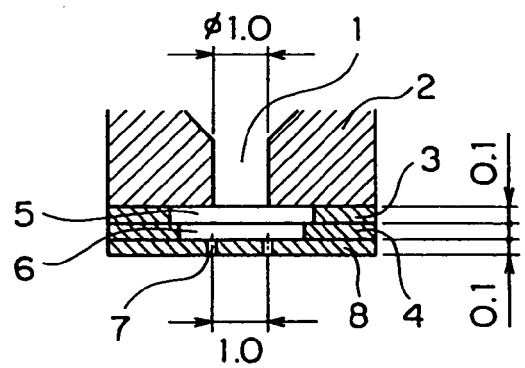
FIG. 26 is a block diagram of a two-hole slit type nozzle.
Figure 26:
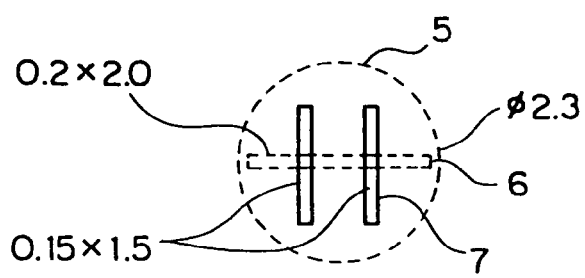

FIG. 26 shows a two-hole slit type multilayer plate. This type was derived based on the same concept as that of the slit type shown in FIG. 12. The fuel flowing out of the nozzle hole 1 spreads transversely in an intermediate chamber 5 formed in a plate 3, passes through a slit 6 formed in a plate 4, and ejects from slits 7 formed in a plate 8. Since the fuel flowing from the slit 6 into the slits 7 ejects after once spreading transversely in the slit 7, the ejected fuel spray from one slit has a very thin film shape. Therefore, as the whole spray, a spray with a thickness is formed. The crossing angle between the slits is preferably 90 degrees.

Figure 27:
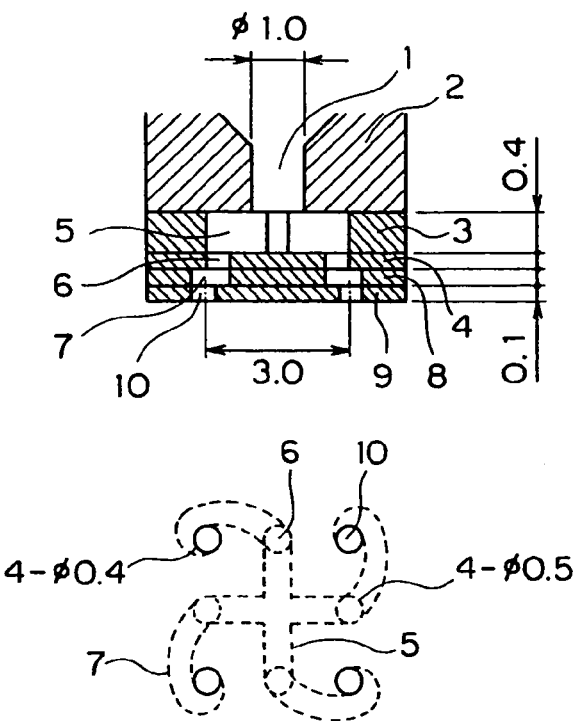
FIG. 27 is a block diagram of a four-hole independent swirl type nozzle.

FIG. 27 shows a four-hole independent swirl type multilayer plate. The fuel flowing out of the nozzle hole 1 spreads transversely in an intermediate groove 5 formed in a plate 3, passes through ejection holes 6 formed in a plate 4 and swirl groove 7 formed in a plate 8, and, after being given a swirling force, ejects from ejection holes 10 formed in a plate 9. Although the plate formed with four ejection holes is shown, two or more ejection holes may be formed.

Figure 28:
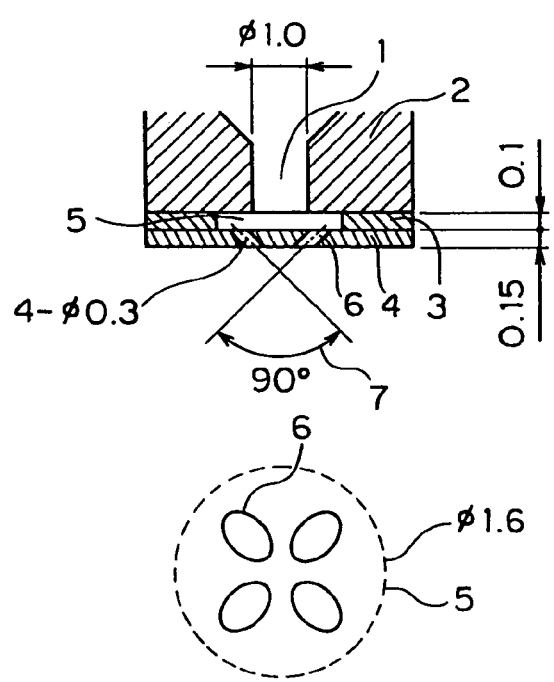
FIG. 28 is a block diagram of a four-hole collision type nozzle.

FIG. 28 shows a four-hole collision type multilayer plate. The fuel flowing out of the nozzle hole 1 spreads transversely in an intermediate chamber 5 formed in a plate 3, and ejects from ejection holes 6 formed in a plate 4. Although the plate formed with four ejection holes is shown, two or more ejection holes may be formed. The ejection holes have an angle denoted by an arrow mark 7 so that fuel is ejected to the inside. Therefore, the ejected fuels collide with each other in the vicinity of the tip end of nozzle.

Figure 29:
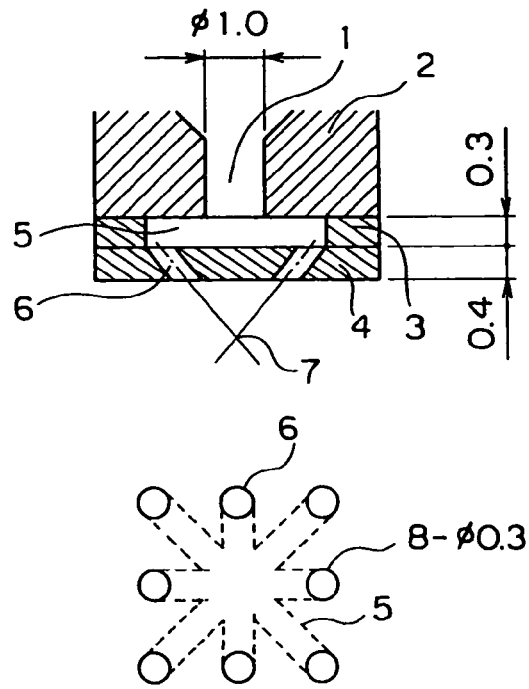
FIG. 29 is a block diagram of an eight-hole collision type nozzle.

FIG. 29 shows an eight-hole collision type multilayer plate. The fuel flowing out of the nozzle hole 1 spreads transversely in an intermediate groove 5 formed in a plate 3, and ejects from ejection holes 6 formed in a plate 4. Although the plate formed with eight ejection holes is shown, two or more ejection holes may be formed. The eight holes have an angle such that the ejected fuels collide with each other at a point 7.

Figure 30:
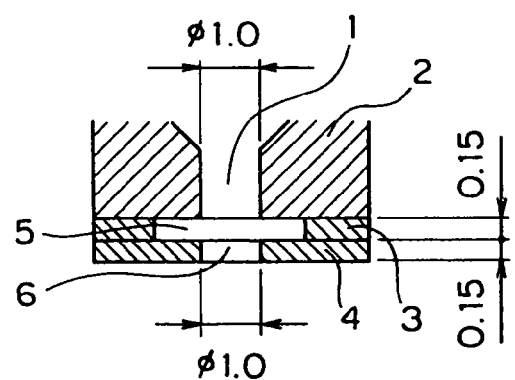
FIG. 30 is a block diagram of a spray resonance type nozzle.
Figure 30:
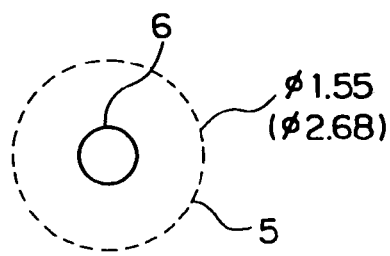

FIG. 30 shows a spray resonance type multilayer plate. The fuel flowing out of the nozzle hole 1 spreads transversely in an intermediate chamber 5 formed in a plate 3, and ejects from an ejection hole 6 formed in a plate 4. The fuel spreading transversely in the intermediate chamber 5 and the fuel ejecting from the ejection hole 6 resonate, and turbulence energy is given to the fuel. The resonance wavelength changes depending on the size of the intermediate chamber.

Figure 31:
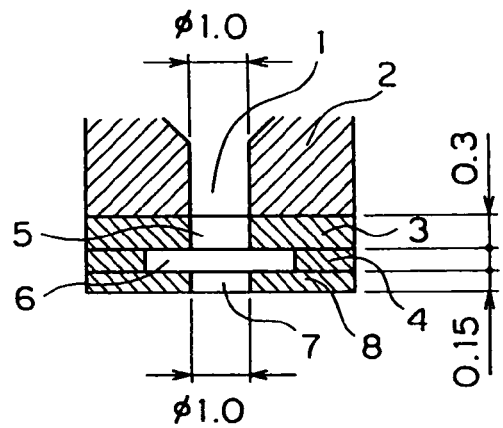
FIG. 31 is a block diagram of another spray resonance type nozzle.
Figure 31:
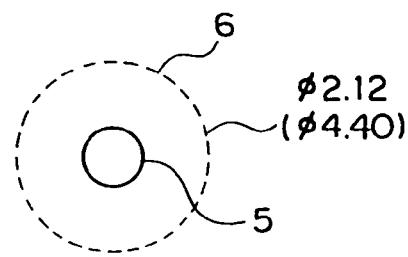

FIG. 31 also shows a spray resonance type multilayer plate. The fuel flowing out of the nozzle hole 1 spreads transversely in an intermediate chamber 6 formed in a plate 4, and ejects from an ejection hole 7 formed in a plate 8. A plate 3 is formed with a single hole with the same inside diameter as that of the nozzle hole 1 to change a distance from a valve seat of the fuel injection valve to the intermediate chamber 6. Thereby, the resonance frequency of the fuel spreading transversely and the fuel ejecting from the ejection hole 7 is changed.

Figure 32:
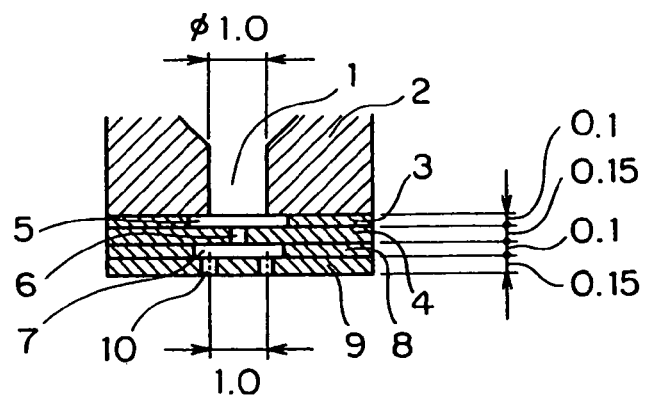
FIG. 32 is a block diagram of a flow path change type nozzle.
Figure 32:
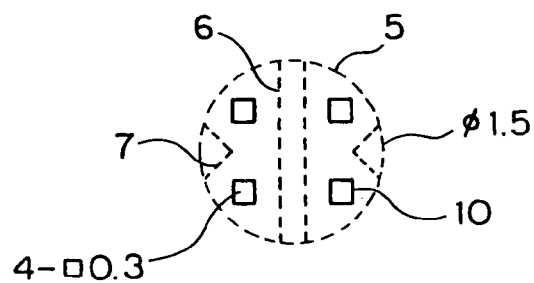

FIG. 32 shows a flow path change type multilayer plate. The fuel flowing out of the nozzle hole 1 spreads transversely in an intermediate chamber 5 formed in a plate 3, passes through a slit 6 formed in a plate 4, and flows into an intermediate chamber 7 formed in a plate 8. The intermediate chamber 7 has a shape such that projecting portions 7 are added to the shape of the intermediate chamber 5. The fuel having passed through the slit 6 is divided into two flows, a flow along the outer periphery of the intermediate chamber 7 and a flow along the projecting portion from the center. By these two flows, the fuel is swirled near the inlets of ejection holes 10 formed in a plate 9.

In the above-described embodiment, the thickness of the plates 3, 4, 8 and 9 may be about 0.1 to 0.3 mm.

As the system for atomization, a thin film atomization system, a collision atomization system, a swirl atomization system, and an atomization system utilizing turbulence are available. In FIGS. 23 to 26, the thin film atomization system is used, in FIGS. 28 and 29, the collision atomization system is used, in FIGS. 20 to 22, 27, and 32, the swirl atomization system is used, and in FIGS. 17 to 19, 30, and 31, the atomization system utilizing turbulence is used.

Another embodiment of the present invention will be described below with reference to FIG. 33 and the following drawings.

Figure 33:
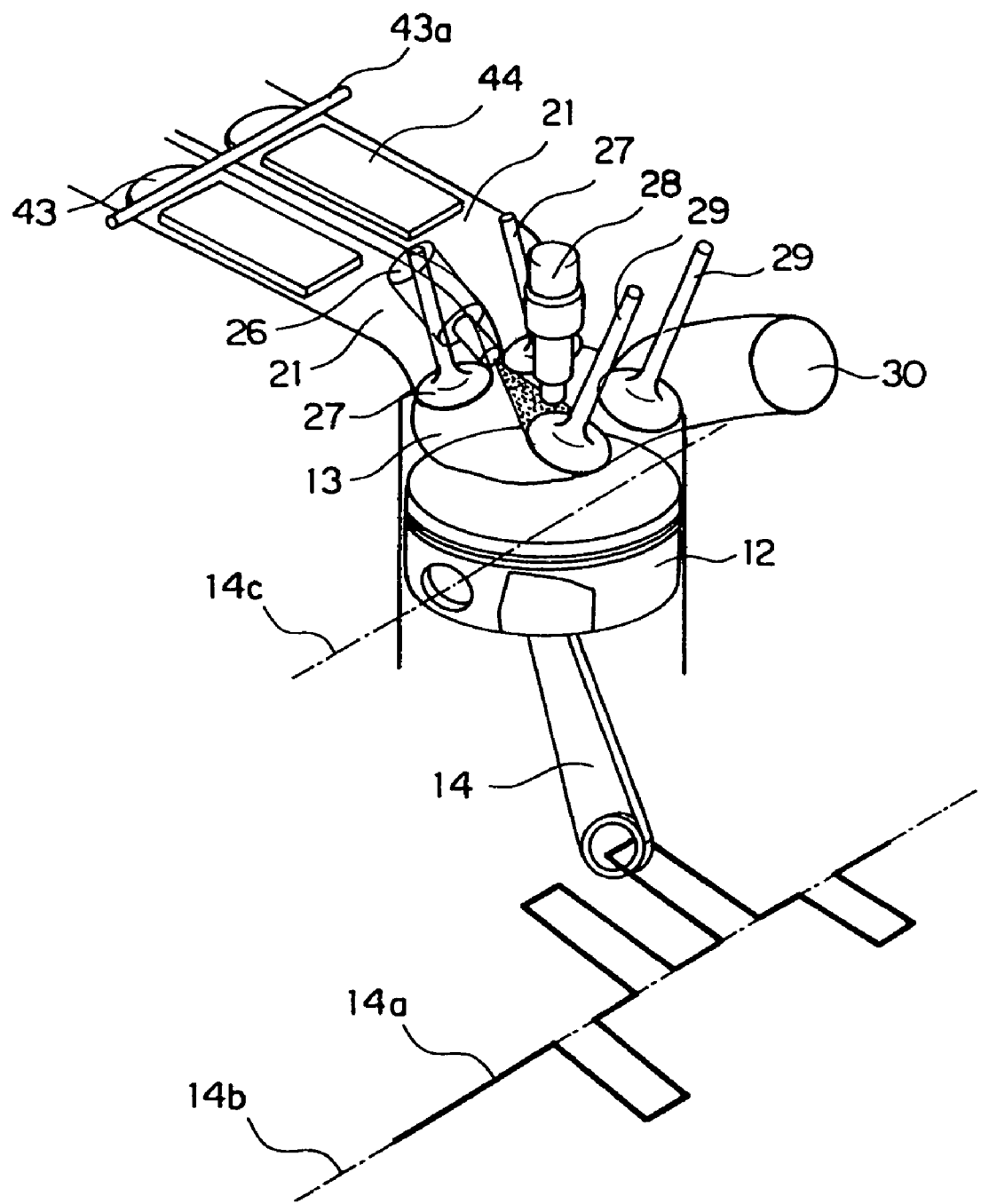
FIG. 33 is a perspective view showing an engine configuration in accordance with the embodiment.

FIG. 33 is a block diagram of another embodiment. FIG. 33 is a perspective view of an engine in accordance with the embodiment. The main components include a notched valve 43, serving as air flow generating means for generating air flow in a combustion chamber 13, a shaft 43a, a partitioning plate 44, a fuel injection valve 26 for injecting fuel into the combustion chamber 13, and a piston 12 having a top face shape such that a sufficient tumble strength can be provided. At the upper part of the combustion chamber 13, that is, on the side opposite to the piston 12, two intake valves 27, two exhaust valves 29, an ignition plug 28, and a fuel injection valve 26 are provided. For the combustion chamber 13 formed by these elements, the volume thereof is changed by the reciprocating motion of the piston 12. When the piston 12 lowers with the intake valves 27 being opened, air is sucked through intake ports 21. The amount of air sucked into the combustion chamber 13 is measured by an air amount sensor (not shown), and the amount of fuel injected from the fuel injection valve 28 is determined based on the measured value. Two intake valves 27 are provided to increase the amount of intake air. The intake ports 21 form flow paths communicating with the two intake valves 27. The fuel injection valve 26 is installed between these flow paths, that is, between the two intake valves 27. Reference numeral 14a denotes a crankshaft of an engine, which shows an example for a four-cylinder engine. Reference numeral 14b denotes the axis of the crankshaft 14a, and 14c denotes the axis of a piston pin of the piston 12. The fuel injection valve 26 is installed so that the axis thereof is perpendicular to the axis 14c of the piston pin or the axis 14b of the crankshaft. The axis of the fuel injection valve 26 is inclined toward a lower portion of the ignition plug 28, which is installed at the upper part of the combustion chamber 13, so that fuel easily concentrates around the ignition plug 28. By this configuration, in injecting on the intake stroke, fuel can be distributed widely in the combustion chamber 13, and in injecting on the second half stage of the compression stroke, sprays can be concentrated easily in the direction of the ignition plug 28. A tumble flow concentrated in the combustion chamber turns to a stratum of air flow on the piston 12, producing an air wall. The fuel spray is conveyed in the direction of ignition plug by this air flow. Further, the fuel spray is prevented from sticking to the piston top face because it is guided by the air wall. This system is referred to as a tumble air guide system. The spray shape and the injection direction of the fuel spray are set so that the fuel spray easily reaches the periphery of a plug gap of the ignition plug 28.

Figure 34:
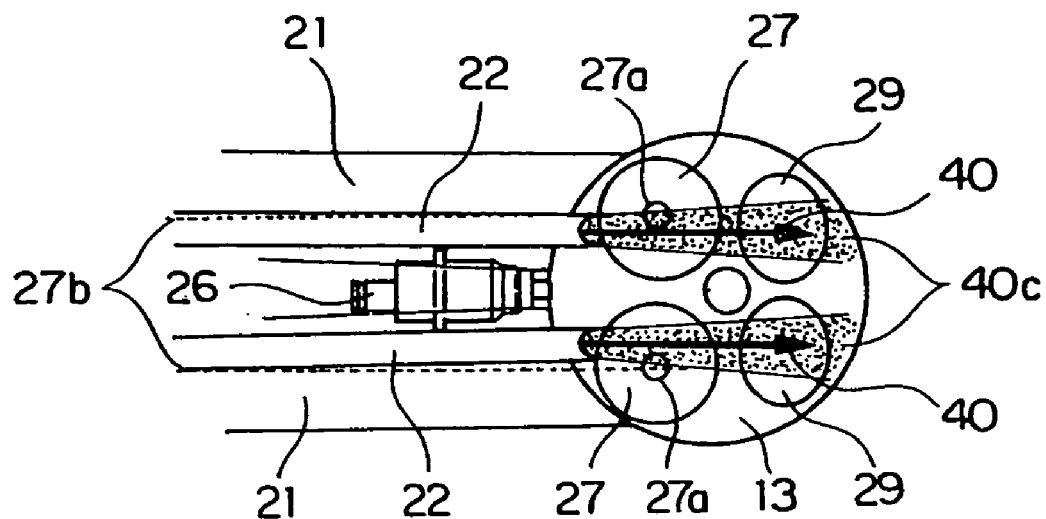
FIG. 34 is a view showing one example (long subsidiary intake air passage) of air flow generating means, FIG. 34(a) being a top view, and FIG. 34(b) being a side view.
Figure 34:
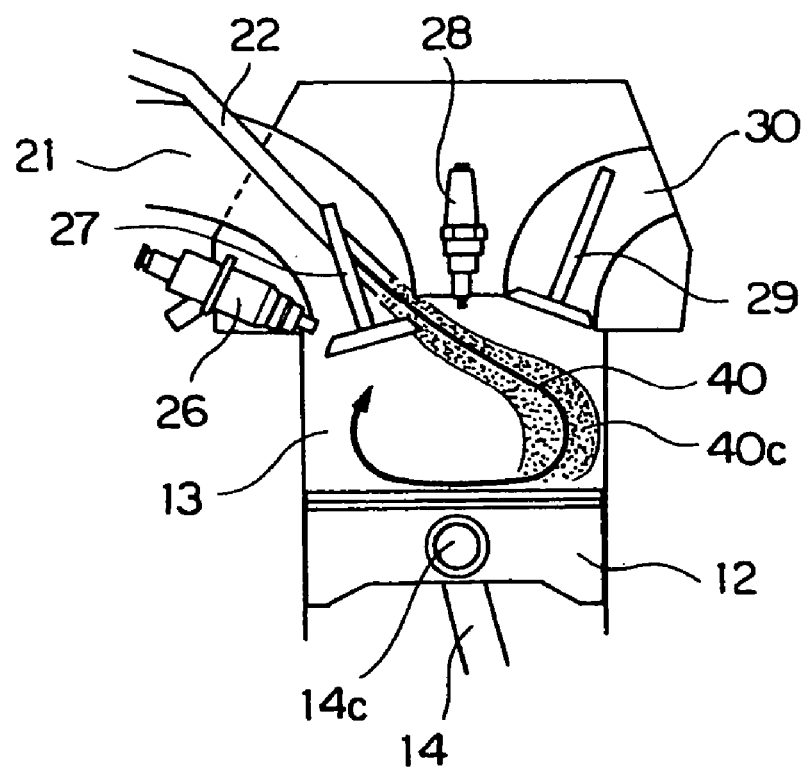

FIGS. 34 to 37 show configuration examples of tumble generating means. FIG. 34 shows a configuration in which a subsidiary intake air passage 22 is provided in the intake port 21. When the intake valves 27 are opened and the piston 12 lowers, air is sucked through the intake ports 21 and the subsidiary intake air passages 22. Although not shown in the figure, by closing valves installed in the intake ports 21, the air flow through the intake ports 21 is weakened, and the air flow through the subsidiary intake air passages 22 is strengthened. Since the inside diameter of the subsidiary intake air passage 22 is set to be smaller than that of the intake port 21, the flow velocity of air flowing through the subsidiary intake air passage 22 is high. The main flow of air flowing out of the subsidiary intake air passage 22, which is as denoted by an arrow mark 40, has an influence on the ambient air 40c, generally forming a tumble flow.

Figure 35:
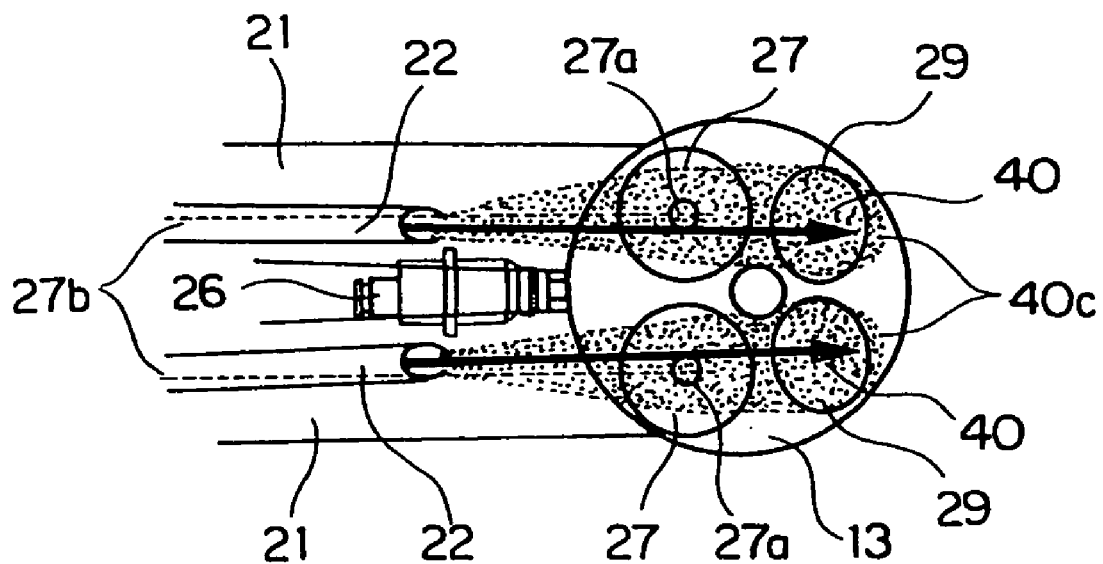
FIG. 35 is a view showing one example (short subsidiary intake air passage) of air flow generating means, FIG. 35(a) being a top view, and FIG. 35(b) being a side view.
Figure 35:
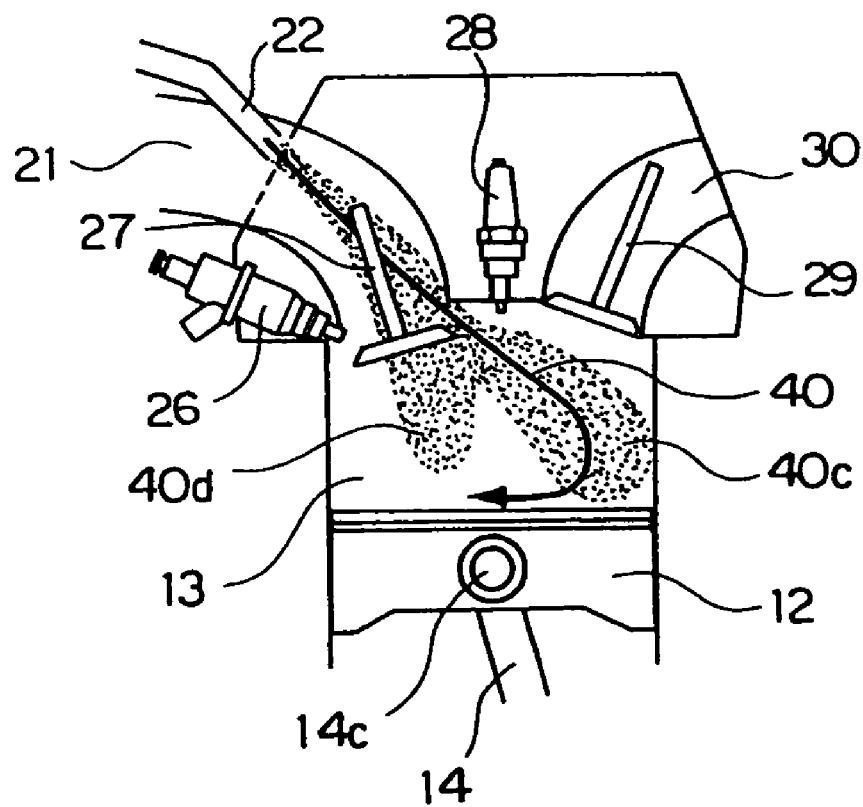

FIG. 35 shows a configuration in which the subsidiary intake air passage 22 is provided in the intake port 21, in which a case where the subsidiary intake air passage 22 is short is shown. In this case, the main flow of air going out of the subsidiary intake air passage 22 is as denoted by reference numeral 40, and conveys the ambient air 40c, but a flow 40d whose velocity is relatively low is produced undesirably. As a result, the air flow has a poor directivity as compared with the case where the subsidiary intake air passage 22 is long, so that a tumble flow necessary for the tumble air guide system is not formed.

Figure 36:
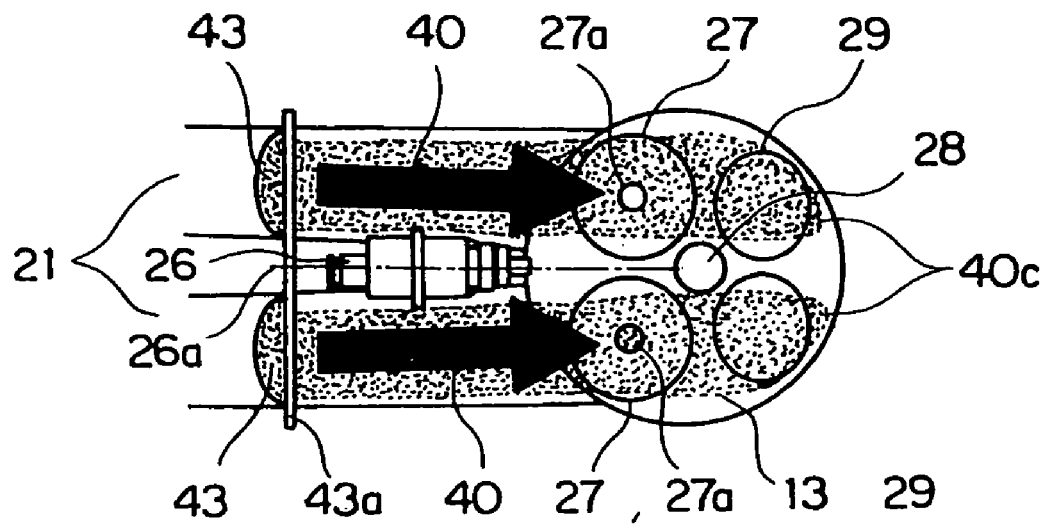
FIG. 36 is a view showing one example (notched valve) of air flow generating means, FIG. 36(a) being a top view, and FIG. 36(b) being a side view.
Figure 36:
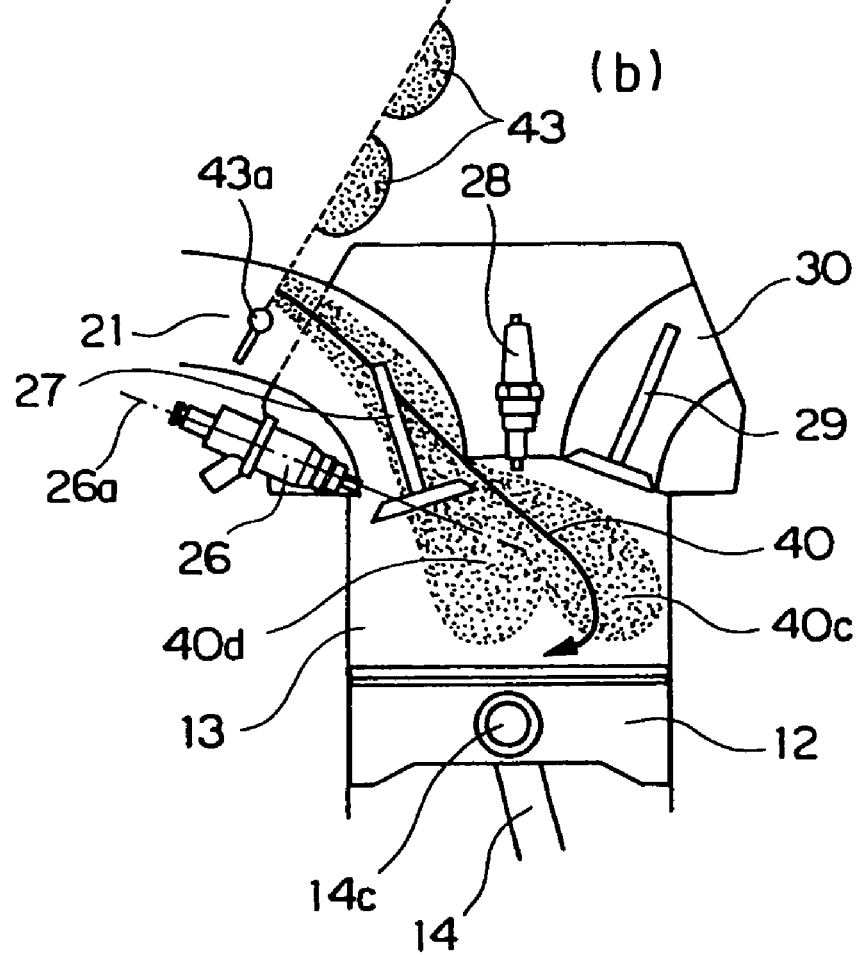

FIG. 36 shows a configuration in which the notched valve 43 is provided at an intermediate position of the intake port 21. The notched valve 43 is fixed to the shaft 43a penetrating the intake port wall so as to be opened and closed by rotating the shaft 43a. When the notched valve 43 is closed, the passage of lower half of the opening of the intake port 21 is closed. Thereby, the flow velocity of intake air is increased. The notched valve 43a is inevitably located at a position distant from the intake valve 27 because of the construction of the engine head. Therefore, although the main flow is as denoted by reference numeral 40, the flow expands immediately after passing through the notched valve 43, producing a flow denoted by reference numeral 40d, so that the air flow has a poor directivity.

Figure 37:
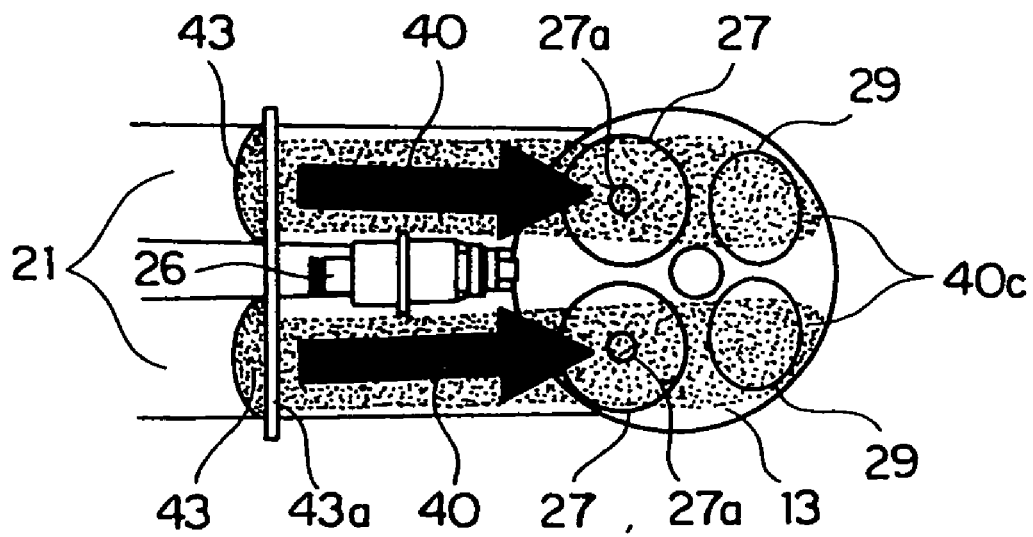
FIG. 37 is a view showing one example (notched valve+ gate valve) of air flow generating means, FIG. 37(a) being a top view, and FIG. 37(b) being a side view.
Figure 37:
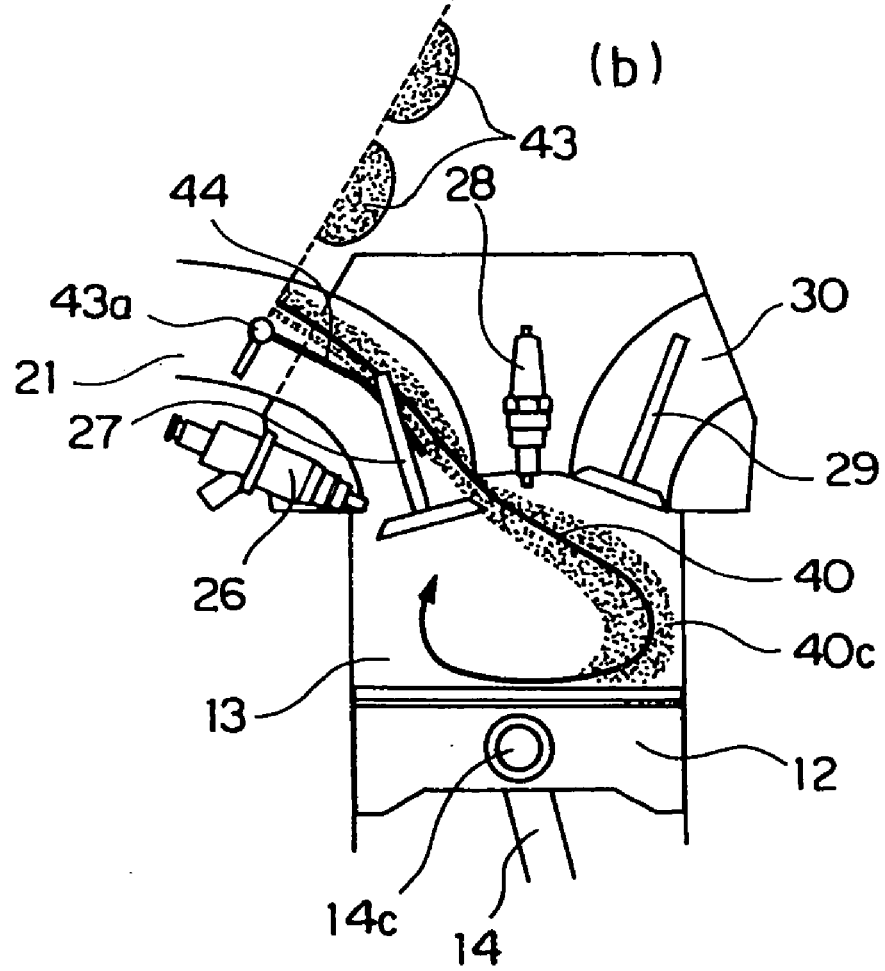

FIG. 37 shows a configuration in which the notched valve 43 is provided at an intermediate position of the intake port 21, and the partitioning plate 44 is provided to prevent the diffusion of flow after the air flow passes through the notched valve 43. By this configuration, the air passage is formed so as to be kept smaller than the intake port 21 to a position near the intake valve 27, so that the flow velocity of air is increased. The main flow, which is as denoted by an arrow mark 40, has an influence on the ambient air 40c, generally forming a tumble flow. The notched valve 43 is referred to as a tumble control valve.

Figure 38:
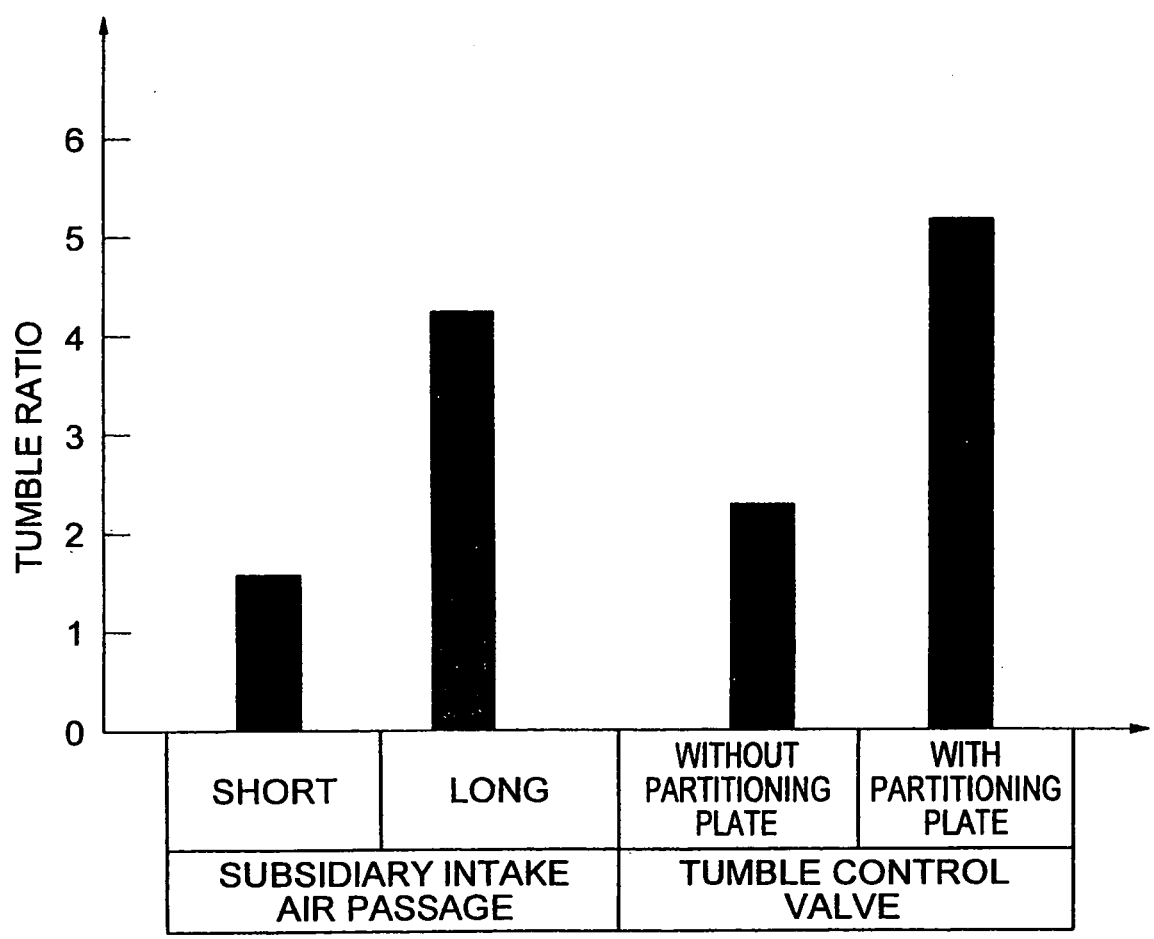
FIG. 38 is a graph showing a comparison of tumble ratios of air flow generating means.

FIG. 38 shows a comparison result for the performance of tumble generating means. The tumble ratio denoted on the ordinate is defined by the number of vertical rotations of air flow during one reciprocating motion of piston (from the intake stroke to the compression stroke). Therefore, the larger numerical value denotes a stronger tumble air flow. In the case of the subsidiary intake air passage, the longer subsidiary intake air passage 22 provides a higher tumble ratio, and in the case of the tumble control valve 43, the presence of the partitioning plate 44 provides a higher tumble ratio. This is because of a construction for preventing the diffusion of flowing-in air to a position near the intake valve. Therefore, by the above-described configuration, a tumble air flow necessary for the air guide system of the present invention can be generated.

Figure 39:
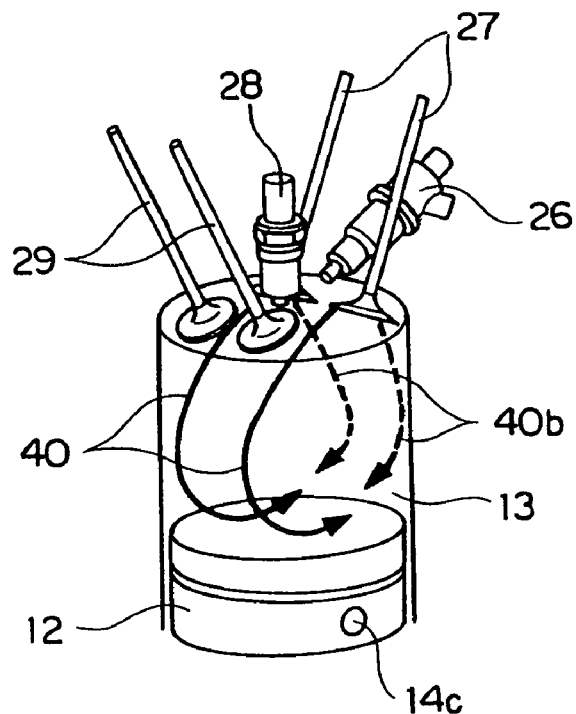
FIG. 39 is a perspective view showing an air flow in a combustion chamber in the case of flat piston.
Figure 39:
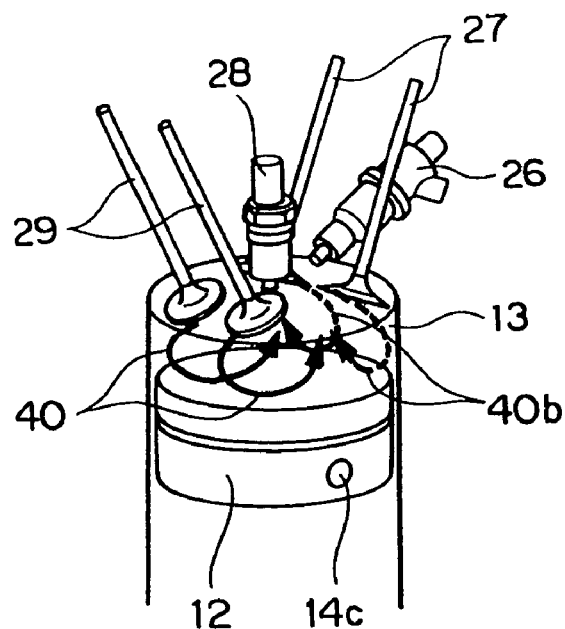

FIG. 39 shows a tumble air flow generated in the combustion chamber 13 when the piston top face is flat. An object of the tumble generating means shown in FIGS. 34 to 37 is to generate the tumble air flow 40 having directivity in the combustion chamber 13. On the actual intake stroke, however, there exists an air flow 40b which passes through the lower side of the intake valve 27 and flows into the combustion chamber. This air flow 40b is a flow in the direction opposite to the flow 40, that is, an inverse tumble flow, which weakens the tumble flow necessary for the tumble air guide system of the present invention. It is preferable that the inverse tumble flow 40b be reduced, or the influence thereof be lessened. Sometimes, however, it is difficult to reduce the inverse tumble flow 40b depending on the shape of the intake port. If the tumble air flow 40 can be generated more strongly, the influence of the inverse tumble flow 40b can be lessened.

FIG. 39(a) is a schematic view showing air flows at the bottom dead center (180 deg BTDC) of the intake stroke. The air flow 40 having directivity, which has passed through the tumble generating means, goes along the cylinder wall on the exhaust side, and the direction thereof is changed by the piston top face. When the piston top face is flat, the direction of the air flow 40 is changed through about 90 degrees, preventing smooth flow. Therefore, as shown in FIG. 39(b), at the second half stage of the compression stroke (60 deg BTDC), the flows 40 and 40b cancel each other. To solve this problem, some consideration is needed to strengthen the air flow 40.

Figure 40:
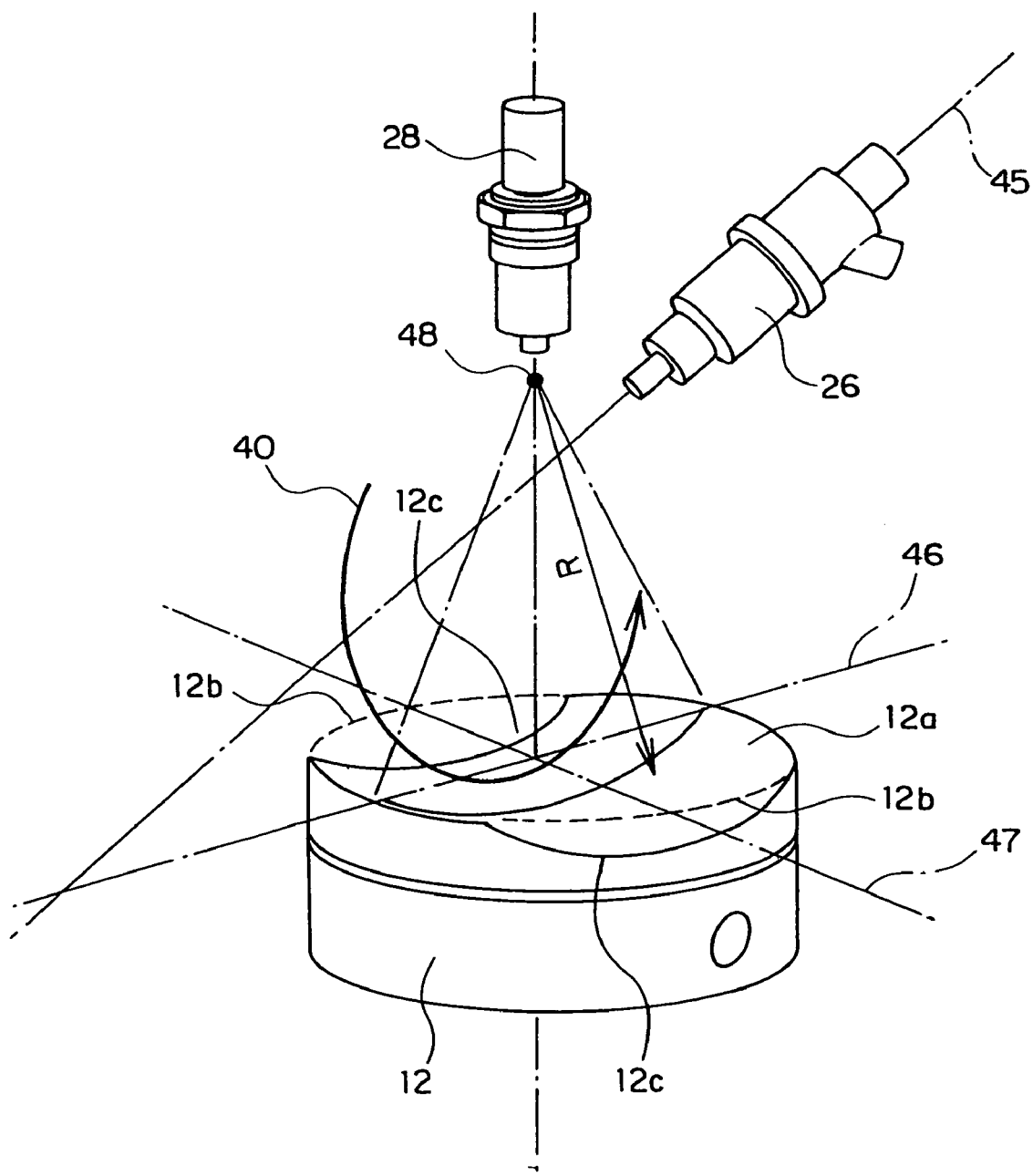
FIG. 40 is a perspective view showing a shape of an improved piston.
Figure 40:
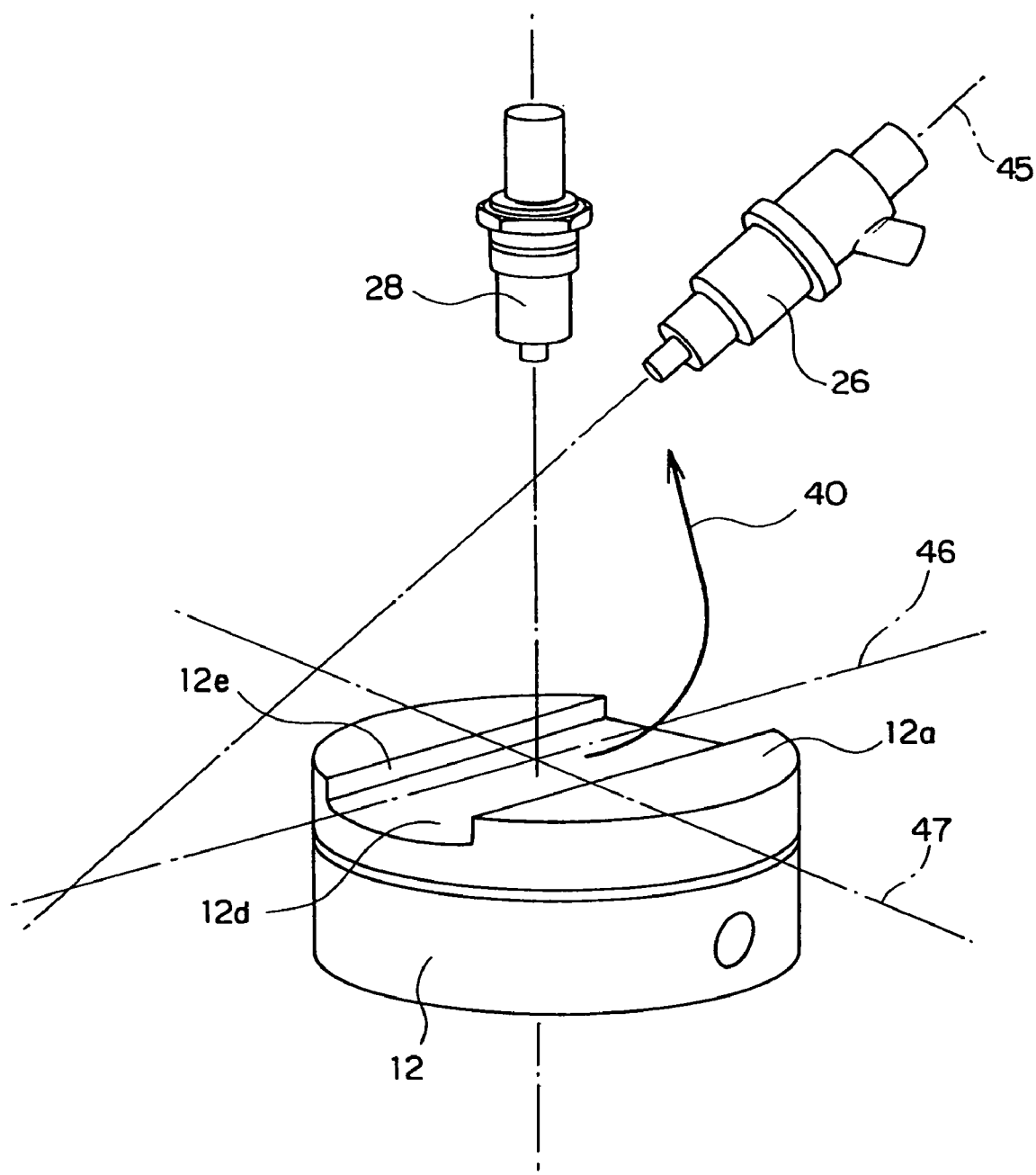

FIG. 40 shows a piston top face improved to strengthen the air flow 40. The fuel injection valve 26 and the ignition plug 28 denote the positional relationship such that they are installed on the engine head.

FIG. 40(a) shows the piston top face which is curved to smoothen the flow on the piston top face. A chain line 47 is parallel with the crankshaft of the engine, and a chain line 46 is perpendicular to the chain line 47. A chain line 45 lies on the same plane as that of the chain line 46, and passes through the center of the fuel injection valve 26. The top face of the piston 12 has a arcuate shape 12a with a point 48 being the center. As a result, the outer peripheral portion 12b of the piston top face is as denoted by reference numeral 12c. By this shape, the direction of the tumble air flow 40 is changed smoothly, preventing the flow from being weakened.

FIG. 40(b) shows the piston top face which is formed with a groove 12d to prevent the tumble air flow 40 from diffusing in the direction of the chain line 47. The groove 12d is parallel with the chain line 46, and is provided so that the air flow 40 is blown up toward the fuel injection valve 26. By providing such a shape of the piston top face, the direction of the air flow 40 is changed smoothly, preventing the flow from being weakened. As an effect of this improvement, an air stratum can be formed on the piston top face to prevent the fuel spray from sticking to the piston, and the fuel spray can be conveyed toward the ignition plug.

Figure 41:
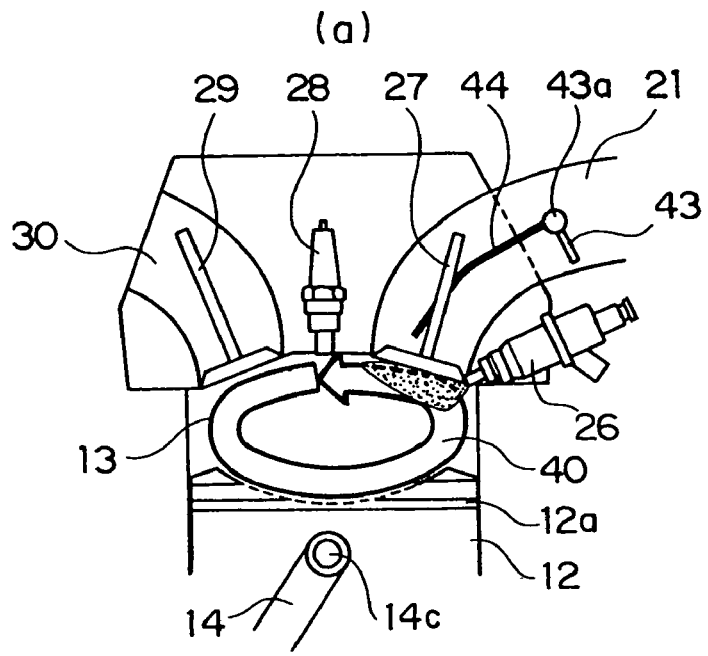
FIG. 41 is a schematic view showing a transfer behavior of fuel spray in accordance with the embodiment.
Figure 41:
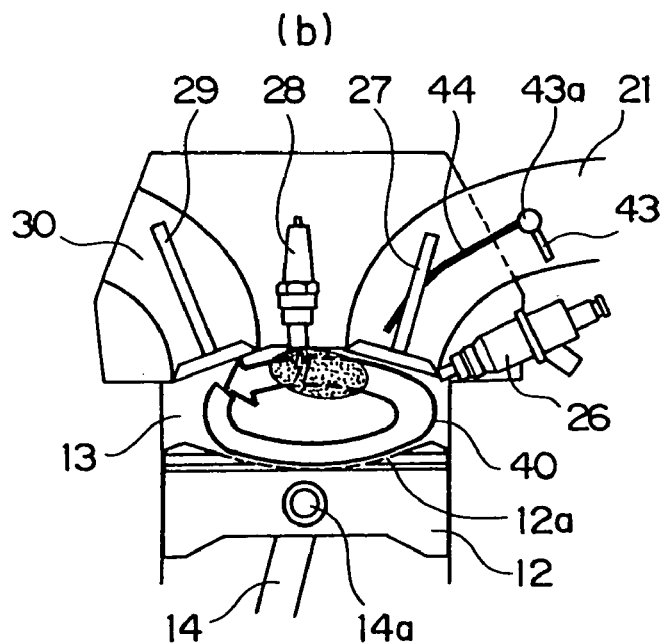

FIG. 41 is a schematic view showing a mixing state in the combustion chamber 13 of an air guide type direct injection engine in accordance with the present invention. The tumble generating means installed in the intake port 21 is composed of the notched valve 43, the shaft 43a, and the partitioning plate 44.

When the notched valve 43 is closed, most of the intake air during the intake stroke passes through the upper side of the partitioning plate 44, and flows into the combustion chamber. As a result, a tumble air flow 40 is formed in the combustion chamber 13. The air flowing into the combustion chamber on the intake stroke on which the intake valve 27 is open flows along the wall surface of combustion chamber on the side distant from the fuel injection valve 26, that is, on the side of the exhaust valve 29. The piston top face is formed into an arcuate shape so that the air flow 40 flows smoothly, and is further formed with a groove for preventing the diffusion. By this configuration, an air stratum is formed on the piston top face, preventing the fuel from sticking thereto. Further, the air flow 40 blows up toward the fuel injection valve 26, and flows along the wall surface of combustion chamber on the side on which the fuel injection valve 26 is installed, and the upper wall, that is, the ceiling wall of the combustion chamber 13, producing a swirl flow. A fuel spray 41 is conveyed toward the ignition plug by this swirl flow. As a result, the spray can reach the plug gap of the ignition plug 28 regardless of the piston position, that is, regardless of the engine rotational speed. This relationship is determined only the distance from the fuel injection position to the plug gap and the spray velocity. Therefore, the stratified charge operation can be performed up to a high rotation region of 3200 rpm.

The tumble air flow 40 used in the present invention once reaches the wall surface of combustion chamber on the side of the exhaust valve in the combustion chamber 13 after going into the combustion chamber, and then returns to the intake side along the shape of the piston top face. Therefore, the fuel spray 41 injected from the fuel injection valve 26 installed between the intake valves 27 reaches the ignition plug 28 through the minimum distance while being borne by the air flow. If the fuel injection valve 26 is located on the side of the exhaust valve 29, the fuel spray 41 flows to the side of the intake valve along the piston top face, and reaches the ignition plug 28. Therefore, the time from when the fuel spray 41 is injected to when it reaches the ignition plug is prolonged. Further, there is undesirably a possibility of the fuel sticking to the piston top face.

In an experiment conducted by using an air guide type direct injection engine in accordance with the present invention, under the operation condition of a rotational speed of 1400 rpm and an denoted mean effective pressure Pi of 320 kPa, the injection timing (FIG. 41(a)) and the ignition timing (FIG. 41(b)) at which operation can be performed stably are 70 deg BTDC and 35 deg BTDC, respectively. At this time, the time taken from injection to ignition is about 3 msec. Under the operation condition of a rotational speed of 3200 rpm and an denoted mean effective pressure Pi of 350 kPa, they are 90 deg BTDC and 30 deg BTDC, respectively. At this time, the time taken from injection to ignition is about 3.12 msec. Therefore, on the air guide type direct injection engine in accordance with the present invention, the time taken from injection to ignition is generally about 3 msec regardless of the engine rotational speed.

The following is a description of the fuel spray using the air guide system in accordance with the present invention.

Figure 42:
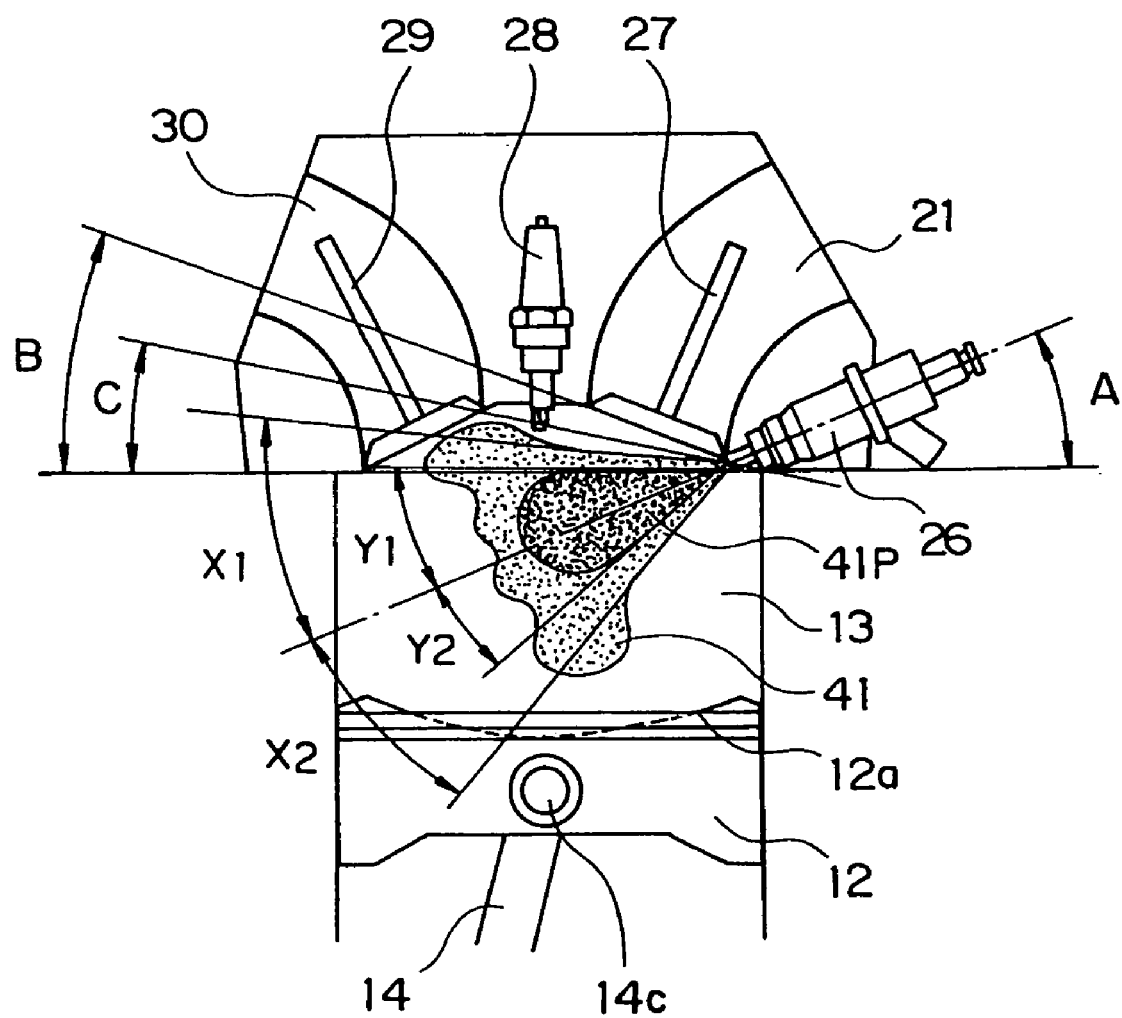
FIG. 42 is a side view showing a relationship between engine shape and fuel spray.

FIG. 42 schematically shows a state of fuel spray injected from the fuel injection valve 26 installed in the engine. A fuel spray 41 shows a spray shape when the ambient atmosphere has the atmospheric pressure, and a fuel spray 41p shows a spray shape at a pressure of 0.6 Mpa. On the intake stroke and at the first half stage of the compression stroke, since the pressure in the combustion chamber 13 is nearly equal to the atmospheric pressure, the fuel spray is as denoted by reference numeral 41. At the second half stage of the compression stroke, the volume of the compression chamber 13 is decreased by the rise of the piston 12, thereby increasing the pressure. Although the ambient pressure varies from 0.1 to 1.0 Mpa depending on the injection timing, the spray shape at a pressure of 0.6 Mpa is shown to identify the spray shape. The spray angle of the fuel spray 41 under the atmospheric pressure is denoted by X1+X2, and the spray angle of the fuel spray 41p under a pressurized condition is denoted by Y1+Y2.

Figure 44:
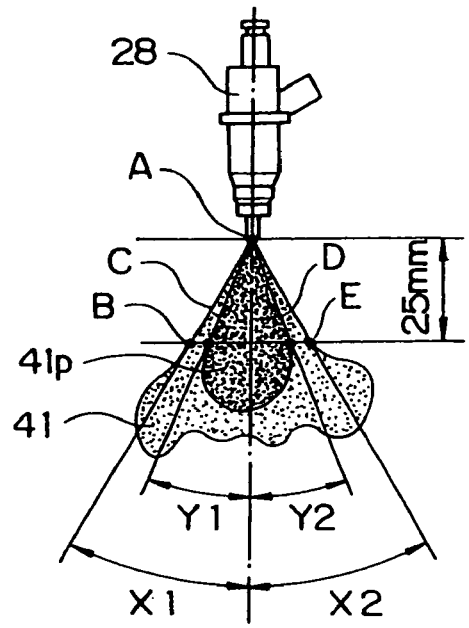
FIG. 44 is an explanatory view for definition of injection angle.

FIG. 44 shows a method for measuring the spray angle. A triangle is formed by a nozzle tip end point A of the fuel injection valve 26 and spray contour points 25 mm down from the point A, and the vertical angle of this triangle is defined as the spray angle. In the case of the fuel spray 41, the spray angle is an angle made by connecting points B-A-E, and in the case of the fuel spray 41p, the spray angle is an angle made by connecting points C-A-D.

Referring to FIG. 42, the fuel injection valve 26 is installed in the engine at an angle A with respect to the horizontal plane. The angle A is referred to as an installation angle. The upper wall of the combustion chamber including the intake valve 27 is located at an angle B with respect to the horizontal plane, and the plug gap of the ignition plug 28 is located at an angle C with respect to the horizontal plane. In the air guide system of the present invention, it is essential that the fuel spray reach a point around the plug gap of the ignition plug to perform the stratified charge operation. It is also essential that the fuel be prevented from sticking to the upper wall of the combustion chamber in order to reduce HC. Therefore, understanding can easily be gained if the spray contour position on the side of the ignition plug is denoted by an angle with respect to the plug gap. An angle defined by the following equation using the angle C denoting the plug gap position and an angle (X1–A) denoting the spray contour position is referred to as a top end angle J.

$$\text{Top end angle } J = (X1 - A) - C \quad (1)$$

Equation (1) denotes the top end angle under the atmospheric pressure, and the top end angle J' under a pressurized condition is defined by the following equation.

$$\text{Top end angle } J' = (Y1 - A) - C \quad (2)$$

The top end angle can be used generally for various types of engines, not for a specific engine, because it is denoted by the spray angle, the installation angle of the fuel injection valve, and the plug gap position.

Figure 43:
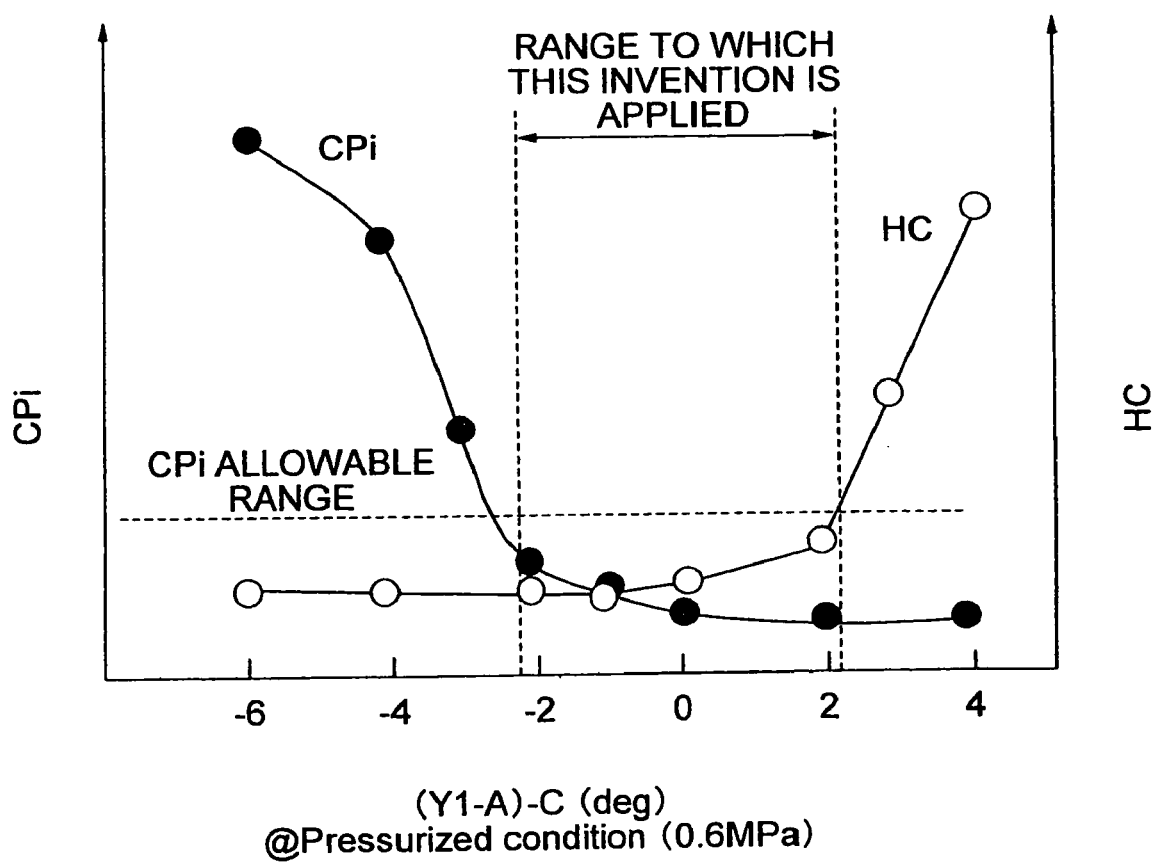
FIG. 43 is a graph showing a relationship between top end angle under a pressurized condition and engine performance.

FIG. 43 shows an experimental result for a relationship between the top end angle and the engine performance. The abscissas denote the top end angle J' under a pressurized condition. The left-hand ordinates denote the combustion variation ratio Cpi, and the right-hand ordinates denote the exhaust concentration of hydrocarbon (HC). Cpi denotes a variation from a mean combustion pressure of about 100 to 1000 cycle. The smaller this value is, the better the combustion stability is. The top end angle of 0 degree means that the spray contour position is located at the same position as the ignition plug gap position. When the top end angle is smaller than this value, the spray contour position does not reach the plug gap, so that the combustion variation ratio Cpi increases. When the top end angle is −2 (deg) or larger, the Cpi allowable range is exceeded. At a top end angle of −2 (deg), the spray does not reach the plug gap. In the present invention, however, the spray actually reaches the plug gap because the spray is blown up toward the plug gap by the action of tumble air flow. On the other hand, a lower HC concentration is preferable. If the top end angle is large, the spray contour position undesirably reaches the upper wall of the combustion chamber and the fuel sticks thereto, so that the exhaust concentration of HC increases undesirably. It can be seen from FIG. 43 that when the top end angle is +2 (deg) or larger, the HC concentration increases, so that the fuel sticks to the upper wall of the combustion chamber. Although the definition of the top end angle does not include the angle B denoting the upper wall position of the combustion chamber, the upper limit value of the top end angle can be estimated by the exhaust behavior of HC. Therefore, in a range of top end angle from −2 to +2 (deg) under a pressurized condition, both of the combustion variation ratio Cpi and the HC exhaust concentration can be satisfied.

Next, a method for measuring a swirl/tumble air flow will be shown. The intensity of swirl/tumble air flow is defined as a swirl ratio or a tumble ratio denoting the number of rotations of swirl or tumble air flow during the time when the engine rotates one turn. The swirl ratio Sr and the tumble ratio Tr are expressed as $$Sr = \omega S / \omega N, \quad Tr = \omega T / \omega N$$

where, $\omega N$ is an engine angular speed, $\omega S$ is a swirl flow, and $\omega T$ is a tumble flow. For example, the swirl ratio $Sr = 1$ means that the swirl flow rotates one turn during the time when the engine rotates one turn.

Figure 45:
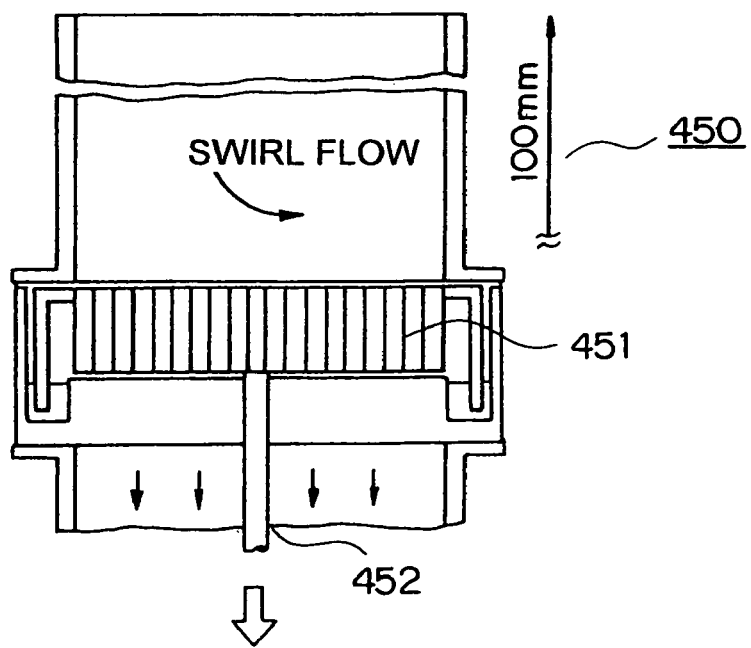
FIG. 45 is a view showing a configuration of an impulse swirl meter.

FIG. 45 shows a method for measuring the swirl air flow. The engine head (an object to be measured which produces swirl or tumble air flow) is installed on the upstream side of an impulse swirl meter 450. Air is drawn by a blower, which is connected downstream so that the air amount corresponding to the engine rotational speed to be measured can flow. Thereby, a rotational torque of swirl or tumble air flow is measured by the impulse swirl meter 450. The impulse swirl meter 450 contains a honeycomb core 451. Angular motion energy of the swirl or tumble air flow is applied to the honeycomb core 451 to rotate the honeycomb core 451. The rotational torque at this time is taken out from the shaft 452, and is measured. From the measured value, the swirl intensity is calculated.

Figure 46:
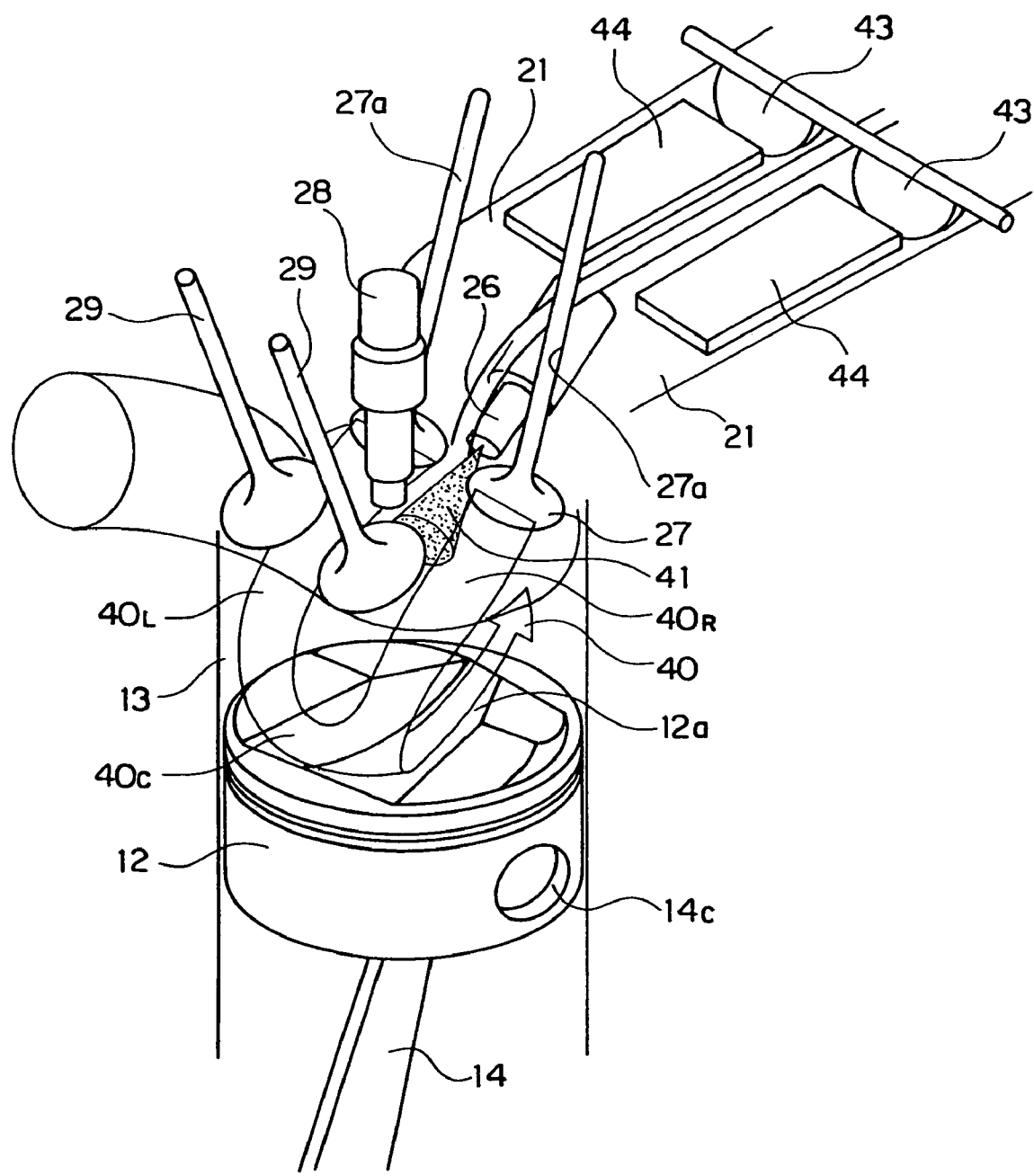
FIG. 46 is a perspective view showing one example of a direct injection type engine using the present invention.
Figure 47:
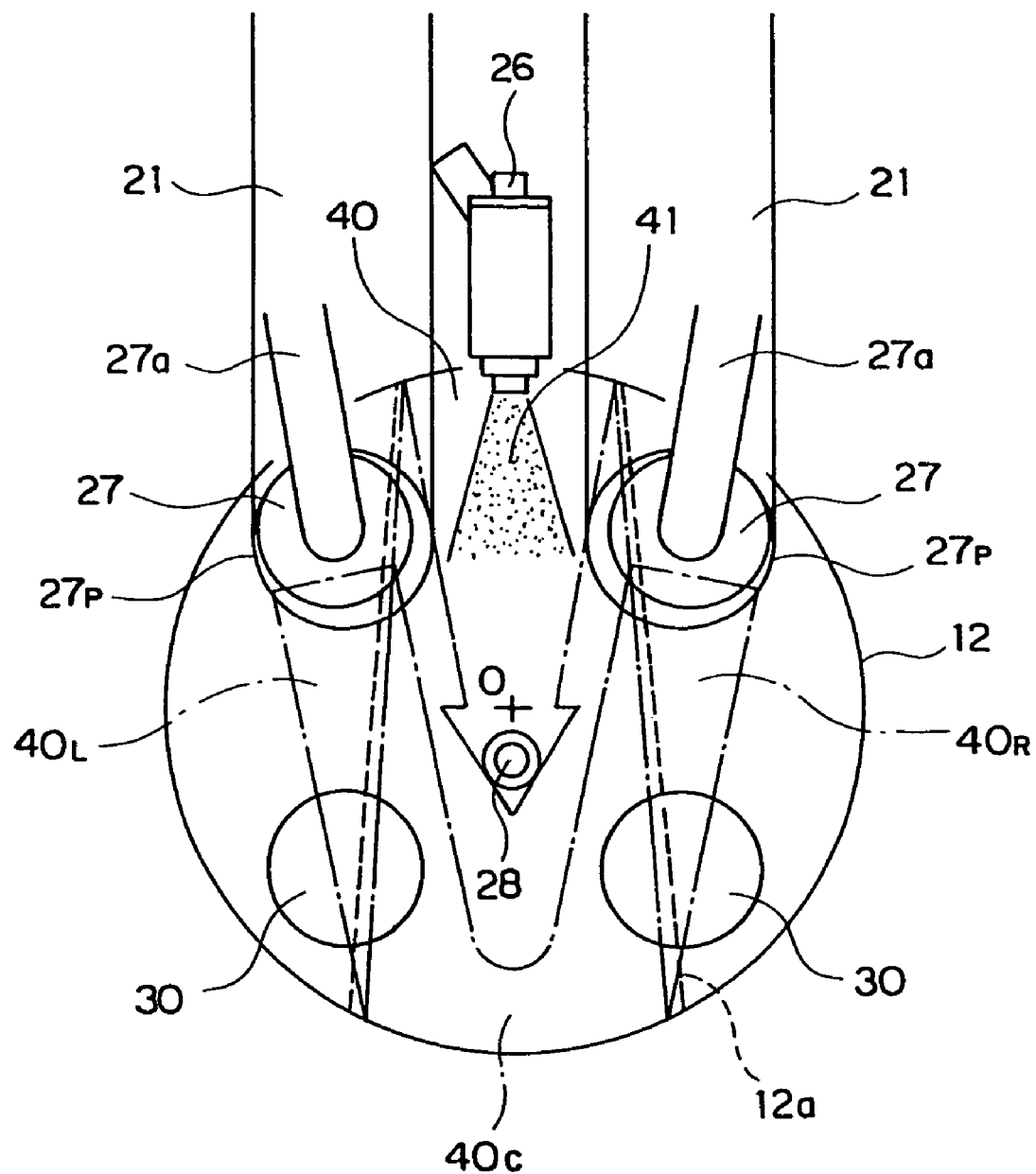

FIG. 46 is a perspective view showing one example of a direct injection type engine using the present invention. Also, FIG. 47 is a schematic view in which FIG. 46 is viewed from above the combustion chamber.

The groove 12a is formed in the top face of the piston 12. This groove 12a is formed across the top face of the piston 12 from a position distant from the fuel injection valve 26 to a position under the fuel injection valve 26.

An inlet of air sucked into the combustion chamber 13, that is, a suction port 27p is provided on the side close to the fuel injection valve 26 at the upper part of the combustion chamber 13.

The flow (denoted by a thick chain line) of air sucked into the combustion chamber 13 through the suction port 27p exhibits a vertical swirl flow which goes toward the side distant from the fuel injection valve 26, returns to a position under the fuel injection valve 26 along the groove 12a formed in the top face of the piston 12, and further rises toward the ceiling wall of the combustion chamber 13 along the wall surface of the combustion chamber on the side on which the fuel injection valve 26 is installed.

Also, two suction ports 27p for sucking air are formed at the upper part of the combustion chamber 13, and the fuel injection valve 26 is installed between the two suction ports 27p.

The axis of the fuel injection valve 26 is inclined toward a position under the ignition plug 28 installed at the upper part of the combustion chamber.

The ignition plug 28 slightly shifts from the center of the upper part of the combustion chamber to the side of an exhaust valve 30. The reason for this is that a distance suitable for carrying the fuel from the fuel injection valve 26 to the ignition plug 28 is ensured. If the plug 28 is located at the center of the upper part of the combustion chamber depending on the type of engine, the distance becomes too short, so that the fuel may pass through the plug earlier than the normal ignition timing.

Further, the axis of the fuel injection valve 26 is arranged so as to be perpendicular to the axis of a connecting pin for connecting the connecting rod 14 to the piston 12, with the result that the groove 12a in the top face of the piston is formed at right angles with respect to a hole 14c for inserting the connecting pin.

This has an effect of keeping a balance of mass of the piston. Also, this has an advantage that even if the groove is formed, the temperature distribution in the piston does not become ill-balanced so much.

Air flows 40L and 40R entering the combustion chamber 13 through the two suction ports 27p go toward the opposite wall so that both the air flows tend to go inside, and join into one flow 40c when they collide with the wall.

After joining, the air flow moves downward along the wall, and is guided to a position under the fuel injection valve 26 by a pair of wall surfaces (denoted by broken lines in FIG. 47) forming the groove 12a of the piston 12.

Then, the air flow collides with the wall on the side of the fuel injection valve 26 and goes upward, and is guided by the ceiling of the combustion chamber 13, the two intake valves 27, 27, or the two air flows 40L and 40R going into the combustion chamber through the two suction ports 27p, 27p. Thereupon, the air flow passes between the two air flows 40L and 40R, going from the fuel injection valve 26 to the ignition plug, and is then absorbed by the air flow 40c.

The fuel injection valve 26 injects fuel into the flow from the fuel injection valve 26 to the ignition plug 28 in such a tumble air flow 40, and the fuel is carried from the fuel injection valve 26 to the ignition plug 28 by the air flow.

With this method, the distance through which fuel is carried is short, so that there is less possibility for the fuel to stick to the wall surface of combustion chamber and the like.

In particular, the piston is isolated by two air strata, a stratum of air flowing to the side of the fuel injection valve 26 by being guided by the groove 12a and a stratum of air flowing from the fuel injection valve 26 to the plug 28. Therefore, the fuel scarcely reaches the piston 12.

In the embodiment with the above-described configuration, an experiment has revealed that the stratified charge operation by the tumble guide can be performed not only in the region of high load and high rotational speed as described above but also under a severe condition such as the cranking time or the cold start time.

Since the stratified charge operation can be performed at the cranking time or the cold start time, ignition can be accomplished surely from the first detonation, and the first misfire at the start time does not occur at all. As a result, the harmful components of exhaust gas can be reduced.

INDUSTRIAL APPLICABILITY

The control method for an internal combustion engine in accordance with the present invention has an excellent effect such that fuel does not stick to the piston at the time of stratified charge combustion, so that exhaust gas can be purified, and also a mixture can be mixed uniformly at the time of homogeneous operation, so that the output can be increased. Therefore, the method is useful for the internal combustion engine, injection valve, and other similar devices, and also is suitable for the stratified charge lean operation at the time of high rotational speed of 120 km/h or 3200 rpm and the increase in fuel efficiency.

What is claimed is:

1. A cylinder injection type internal combustion engine comprising:
    a combustion chamber of said internal combustion engine, into which air is sucked through an intake valve;
    a fuel injection valve for injecting fuel directly into said combustion chamber; and
    operation condition detecting means for detecting the operation condition of said internal combustion engine, characterized in that said internal combustion engine has a control unit for supplying a fuel injection valve driving signal to said fuel injection valve so that fuel is injected for a period of time when the intake air velocity is lower than the spray velocity on the intake stroke when the detected operation condition is at a high load.

2. The cylinder injection type internal combustion engine according to claim 1, comprising:
    swirl flow generating means for generating a swirl air flow in said combustion chamber;
    characterized in that said internal combustion engine has a control unit for supplying a fuel injection valve driving signal to said fuel injection valve so that fuel is injected at the second half stage of the compression stroke when the detected operation condition is at a low load.

3. The cylinder injection type internal combustion engine according to claim 1, comprising:
    swirl flow generating means for generating a swirl air flow in said combustion chamber;
    wherein said internal combustion engine has a control unit for supplying a fuel injection valve driving signal to said fuel injection valve so that fuel is injected on the intake stroke when the detected operation state is at a medium load.

4. The cylinder injection type internal combustion engine according to claim 1, wherein
    said control unit supplies a fuel injection valve driving signal to said fuel injection valve so that fuel is injected a plurality of times before and after the timing at which said intake valve is fully opened.

5. The cylinder injection type internal combustion engine according to claim 1, wherein said fuel injection valve is an upstream swirl type fuel injection valve and said internal combustion engine has a control unit for supplying a fuel injection valve driving signal to said fuel injection valve so that fuel is injected at a time for a period of time when the intake air velocity is higher than the spray velocity on the intake stroke when the detected operation condition is at a high load.

* * * * *